United States Patent
Choi et al.

(10) Patent No.: US 11,165,546 B2
(45) Date of Patent: Nov. 2, 2021

(54) METHOD FOR RECEIVING SRS CONFIGURATION INFORMATION IN WIRELESS COMMUNICATION SYSTEM AND TERMINAL THEREFOR

(71) Applicant: LG Electronics Inc., Seoul (KR)

(72) Inventors: Kukheon Choi, Seoul (KR); Jonghyun Park, Seoul (KR); Jiwon Kang, Seoul (KR); Kyuseok Kim, Seoul (KR); Minki Ahn, Seoul (KR); Kilbom Lee, Seoul (KR)

(73) Assignee: LG Electronics Inc., Seoul (KR)

(*) Notice: Subject to any disclaimer, the term of this patent is extended or adjusted under 35 U.S.C. 154(b) by 47 days.

(21) Appl. No.: 16/611,576

(22) PCT Filed: Jan. 18, 2018

(86) PCT No.: PCT/KR2018/000857
§ 371 (c)(1),
(2) Date: Nov. 7, 2019

(87) PCT Pub. No.: WO2018/207995
PCT Pub. Date: Nov. 15, 2018

(65) Prior Publication Data
US 2020/0204313 A1    Jun. 25, 2020

Related U.S. Application Data

(60) Provisional application No. 62/520,566, filed on Jun. 16, 2017, provisional application No. 62/502,781, filed on May 8, 2017.

(51) Int. Cl.
*H04W 72/04* (2009.01)
*H04L 5/00* (2006.01)

(52) U.S. Cl.
CPC ......... *H04L 5/0048* (2013.01); *H04W 72/042* (2013.01)

(58) Field of Classification Search
CPC ................ H04L 5/0048; H04W 72/042
See application file for complete search history.

(56) References Cited

U.S. PATENT DOCUMENTS

2011/0075760 A1* 3/2011 Ogawa ............... H04J 1/02
375/296
2011/0310818 A1* 12/2011 Lin ................. H04L 5/0048
370/329

(Continued)

OTHER PUBLICATIONS

Ericsson, "Concatenated block RS design," R1-1612327, 3GPP TSG-RAN WG1#87, Reno, USA, dated Nov. 14-18, 2016, 3 pages.

(Continued)

*Primary Examiner* — Chi Ho A Lee
(74) *Attorney, Agent, or Firm* — Fish & Richardson P.C.

(57) ABSTRACT

A method for a terminal to receive Sounding Reference Symbol (SRS) configuration information in a wireless communication system comprises: a step of receiving SRS configuration information for SRS transmission in units of concatenated SRS blocks from a base station; and a step of transmitting SRS to the base station on the concatenated SRS blocks on the basis of the SRS configuration information, wherein the SRS configuration information may include information indicating a length of one SRS block, information indicating the number of SRS blocks, and information indicating an SRS block in which truncation is performed among the concatenated SRS blocks.

11 Claims, 18 Drawing Sheets

(56) References Cited

U.S. PATENT DOCUMENTS

| | | | | |
|---|---|---|---|---|
| 2012/0014349 A1* | 1/2012 | Chung | ................ | H04B 7/0684 |
| | | | | 370/329 |
| 2012/0063371 A1* | 3/2012 | He | ................ | H04L 5/0007 |
| | | | | 370/280 |
| 2012/0281604 A1* | 11/2012 | Papasakellariou | ................ | |
| | | | | H04L 27/2613 |
| | | | | 370/310 |
| 2014/0003262 A1* | 1/2014 | He | ................ | H04L 1/0026 |
| | | | | 370/252 |
| 2015/0110037 A1* | 4/2015 | Wu | ................ | H04L 5/0048 |
| | | | | 370/329 |
| 2016/0219534 A1* | 7/2016 | Hao | ................ | H04W 52/146 |
| 2017/0187557 A1* | 6/2017 | Zhang | ................ | H04L 27/2666 |
| 2017/0223675 A1* | 8/2017 | Dinan | ................ | H04W 72/042 |
| 2018/0278450 A1* | 9/2018 | Zarifi | ................ | H04L 5/0091 |
| 2019/0081660 A1* | 3/2019 | Han | ................ | H04B 1/7143 |
| 2019/0372734 A1* | 12/2019 | Choi | ................ | H04L 25/0224 |

OTHER PUBLICATIONS

Intel Corporation, "Discussion on SRS for NR," R1-1707368, 3GPP TSG RAN WG1 Meeting #89, Hangzhou, China, dated May 15-19, 2017, 4 pages.

PCT International Search Report and Written Opinion in International Application No. PCT/KR2018/000857, dated Apr. 23, 2018, 23 pages (with English translation).

NTT Docomo, Inc., "SRS design," R1-1702805, 3GPP TSG-RAN WG1 Meeting #88, Athens, Greece, dated Feb. 13-17, 2017, 2 pages.

ZTE, "Discussion on SRS design for NR," R1-1707133, 3GPP TSG RAN WG1 Meeting #89, Hangzhou, P.R. China, dated May 15-19, 2017, 3 pages.

ZTE, ZTE Microelectronics, "Discussion on SRS design for NR," R1-1701818, 3GPP TSG RAN WG1 Meeting #88, Athens, Greece, dated Feb. 13-17, 2017, 3 pages.

\* cited by examiner

FIG. 8
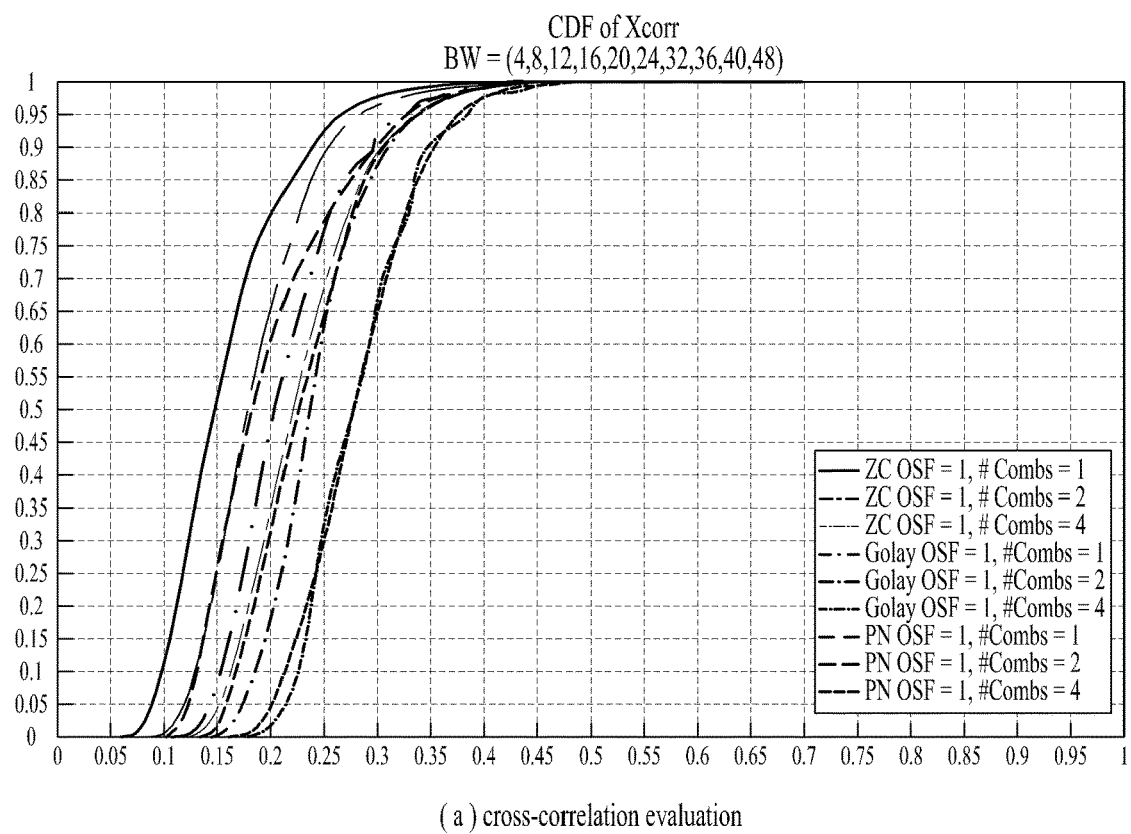
(a) cross-correlation evaluation
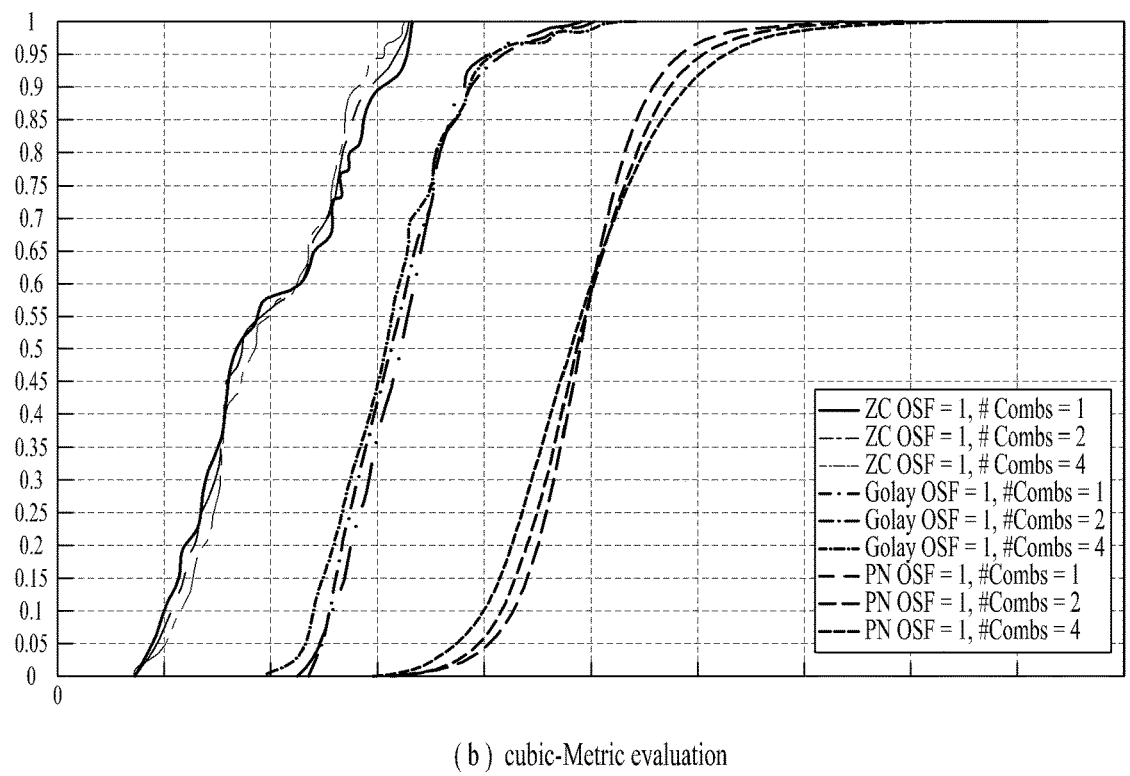
(b) cubic-Metric evaluation $X_1(k)e^{j\frac{2\pi m_1}{M_1}k}$   $X_2(k)e^{j\frac{2\pi m_2}{M_1}k}$  · ·  $X_{M_1}(k)e^{j\frac{2\pi M_1}{M_1}k}$     $X_1(k)$     ZC sequence     $n_i \in \{0, 1, ..., M_1-1\}$ SRS BW dependent PAPR (block length=4RB, TC=4)

block dependent PAPR (SRS BW=96RB, TC=4)

(a) Illustration of first block truncation    (b) Illustration of second block truncation

METHOD FOR RECEIVING SRS CONFIGURATION INFORMATION IN WIRELESS COMMUNICATION SYSTEM AND TERMINAL THEREFOR

CROSS-REFERENCE TO RELATED APPLICATIONS

This application is the National Phase of PCT International Application No. PCT/KR2018/000857, filed on Jan. 18, 2018, which claims the benefit of U.S. Provisional Applications Nos. 62/502,781 and 62/520,566, filed on May 8 and Jun. 16, 2017, respectively, all of which is hereby incorporated by reference herein in their entirety.

TECHNICAL FIELD

The present invention relates to a wireless communication, more specifically, relates to a method of receiving an SRS configuration information in a wireless communication system and a user equipment therefor.

BACKGROUND ART

When a new radio access technology (RAT) system is introduced, as more and more communication devices require larger communication capacity, there is a need for improved mobile broadband communication as compared to existing RAT.

In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, New RAT will provide services considering enhanced mobile broadband communication (eMBB), massive MTC (mMTC), URLLC (Ultra-Reliable Low-Latency Communication), etc.

DETAILED DESCRIPTION OF THE INVENTION

Technical Problems

An object of the present invention is to provide a method of receiving sounding reference symbol (SRS) configuration information by a user equipment in a wireless communication system.

Another object of the present invention is to provide a user equipment for receiving SRS configuration information in a wireless communication system.

The objects to be achieved by the present invention are not limited to what has been particularly described hereinabove and other objects not described herein will be more clearly understood by persons skilled in the art from the following detailed description.

Technical Solutions

To achieve the above described technical object, in an embodiment, a method of receiving Sounding Reference Symbol (SRS) configuration information by a user equipment in a wireless communication system may comprises: receiving SRS configuration information for SRS transmission in a unit of concatenated SRS blocks from a base station; and transmitting an SRS on the concatenated SRS blocks to the base station based on the SRS configuration information, wherein the SRS configuration information includes at least two or more of (1) information indicating a length of one SRS block, (2) information indicating an SRS bandwidth, (3) information indicating a number of SRS blocks, (4) information indicating a starting position or an ending position of an SRS block in a frequency domain, or (5) information about sequence generation parameters for the concatenated SRS blocks.

The information about the sequence generation parameters for the concatenated SRS blocks may include information about values of the sequence generation parameters or a number of the sequence generation parameters. The SRS configuration information may be received through Downlink Control Information (DCI), a MAC Control Element (CE), or Radio Resource Control (RRC) signaling. The SRS configuration information may further include information indicating a SRS block in which truncation is performed among the concatenated SRS blocks and information about a frequency region range in which the truncation is performed. The SRS block in which the truncation is performed is different in length in a frequency region from remaining SRS blocks. The information about the frequency region range in which the truncation is performed may include at least one of a truncation starting position or a truncation ending position. The information about the values of the sequence generation parameters may include at least one of a root index, a cyclic shift (CS) index, a transmission comb (TC), or a TC offset, for sequence generation.

To achieve the above described technical object, in another embodiment, a method of receiving Sounding Reference Symbol (SRS) configuration information by a user equipment in a wireless communication system may comprise: receiving SRS configuration information for SRS transmission in a unit of concatenated SRS blocks from a base station; and transmitting an SRS on the concatenated SRS blocks to the base station based on the SRS configuration information, wherein the SRS configuration information includes information indicating a length of one SRS block, information indicating a number of SRS blocks, and information indicating a SRS block in which truncation is performed among the concatenated SRS blocks.

The method may further comprise transmitting information about an SRS configuration capability of the user equipment to the base station, wherein the SRS configuration information is determined based on the information about the SRS configuration capability of the user equipment. The information about the SRS configuration capability of the user equipment may include at least one of information about a required Peak-to-Average Power Ratio (PAPR), information about a desired SRS bandwidth, or information about a desired SRS allocation position. The unit of the SRS blocks may be a resource block (RB) unit or a resource element (RE) unit.

To achieve the above described another technical object, in an embodiment, a user equipment for receiving control information for Sounding Reference Symbol (SRS) transmission in a wireless communication system may comprise: a transmitter; a receiver; and a processor, wherein the processor controls the receiver to receive SRS configuration information for SRS transmission in a unit of concatenated SRS blocks from a base station, and controls the transmitter to transmit an SRS on the concatenated SRS blocks to the base station based on the SRS configuration information, and wherein the SRS configuration information includes at least one or more of (1) information indicating a length of one SRS block, (2) information indicating an SRS bandwidth, (3) information indicating a number of SRS blocks, (4) information indicating a starting position or an ending position of an SRS block in a frequency domain, or (5) information about sequence generation parameters for the concatenated SRS blocks.

To achieve the above described another technical object, in another embodiment, A user equipment for receiving control information for Sounding Reference Symbol (SRS) transmission in a wireless communication system, the user equipment comprising: a transmitter; a receiver; and a processor, wherein the processor controls the receiver to receive SRS configuration information for SRS transmission in a unit of concatenated SRS blocks from a base station, and controls the transmitter to transmit an SRS on the concatenated SRS blocks to the base station based on the SRS configuration information, and wherein the SRS configuration information includes information indicating a length of one SRS block, information indicating a number of SRS blocks, and information indicating a SRS block in which truncation is performed among the concatenated SRS blocks.

The processor may control the transmitter to transmit information about an SRS configuration capability of the user equipment to the base station, wherein the SRS configuration information may be determined based on the information about the SRS configuration capability of the user equipment.

Advantageous Effects

Flexible resource utilization can be improved by configuring concatenated SRS blocks for cell-centered UEs in a network, and flexibility can be more increased and communication performance can be improved by performing an SRS configuration of truncating an SRS resource length within one block.

The effects that can be achieved by the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention. In the drawings:

FIG. 8 is a diagram showing cross-correlation and cubic-metric evaluations of ZC, Golay and PN sequences.

BEST MODE FOR CARRYING OUT THE INVENTION

Figure 1:
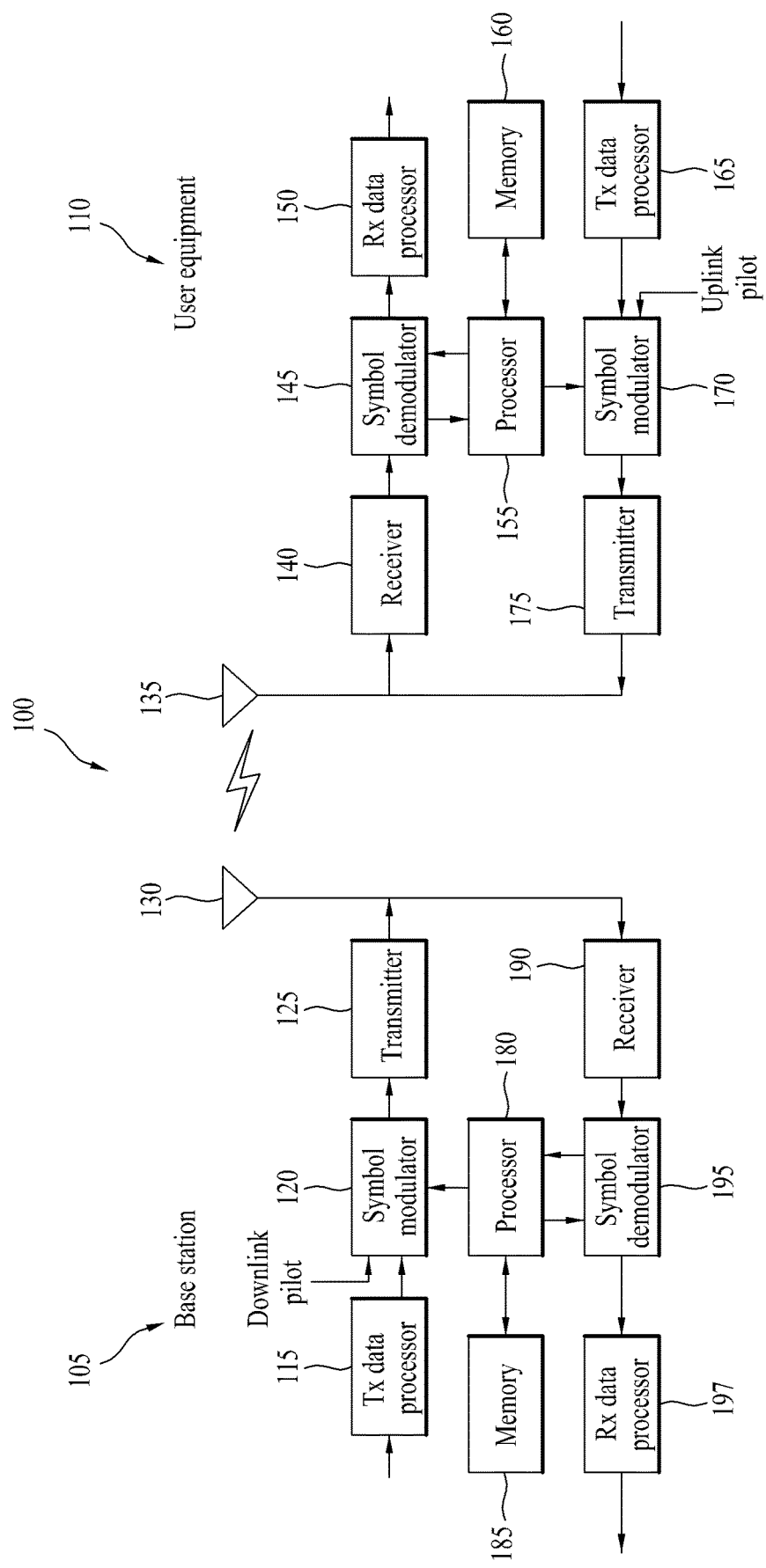
FIG. 1 is a block diagram showing the configuration of a base station (BS) 105 and a user equipment (UE) 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE, LTE-A system, the following descriptions are applicable to other random mobile communication systems in a manner of excluding unique features of the 3GPP LTE, LTE-A systems.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data.

The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal and a storing function without being specially mentioned.

First, SRS transmission in a 3GPP LTE/LTE-A system will be described in Table 1 below.

TABLE 1

A UE shall transmit Sounding Reference Symbol (SRS) on per serving cell SRS resources based on two trigger types:
trigger type 0: higher layer signalling
trigger type 1: DCI formats 0/4/1A for FDD and TDD and DCI formats 2B/2C/2D for TDD.
In case both trigger type 0 and trigger type 1 SRS transmissions would occur in the same subframe in the same serving cell, the UE shall only transmit the trigger type 1 SRS transmission.
A UE may be configured with SRS parameters for trigger type 0 and trigger type 1 on each serving cell. The following SRS parameters are serving cell specific and semi-statistically configurable by higher layers for trigger type 0 and for trigger type 1.
Transmission comb $\bar{k}_{TC}$, as defined in subclause 5.5.3.2 of [3] for trigger type 0 and each configuration of trigger type 1
Starting physical resource block assignment $n_{RRC}$, as defined in subclause 5.5.3.2 of [3] for trigger type 0 and each configuration of trigger type 1
duration: single or indefinite (until disabled), as defined in [11] for trigger type 0
srs-ConfigIndex $I_{SRS}$ for SRS periodicity $T_{SRS}$ and SRS subframe offset $T_{offset}$, as defined in Table 8.2-1 and Table 8.2-2 for trigger type 0 and SRS periodicity $T_{SRS,1}$, and SRS subframe offset $T_{SRS,1}$, as defined in Table 8.2-4 and Table 8.2-5 trigger type 1
SRS bandwidth $B_{SRS}$, as defined in subclause 5.5.3.2 of [3] for trigger type 0 and each configuration of trigger type 1
Frequency hopping bandwidth, $b_{hop}$, as defined in subclause 5.5.3.2 of [3] for trigger type 0
Cyclic shift $n_{SRS}^{cs}$, as defined in subclause 5.5.3.1 of [3] for trigger type 0 and each configuration of trigger type 1
Number of antenna ports $N_p$ for trigger type 0 and each configuration of trigger type 1
For trigger type 1 and DCI format 4 three sets of SRS parameters, srs-ConfigApDCI-Format4, are configured by higher layer signalling. The 2-bit SRS request field [4] in DCI format 4 indicates the SRS parameter set given in Table 8.1-1. For trigger type 1 and DCI format 0, a single set of SRS parameters, srs-ConfigApDCI-Format0, is configured by higher layer signalling. For trigger type 1 and DCI formats 1A/2B/2C/2D, a single common set of SRS parameters, srs-ConfigApDCI-Format1a2b2c, is configured by higher layer signalling. The SRS request field is 1 bit [4] for DCI formats 0/1A/2B/2C/2D, with a type 1 SRS triggered if the value of the SRS request field is set to '1'.
A 1-bit SRS request field shall be included in DCI formats 0/1A for frame structure type 1 and 0/1A/2B/2C/2D for frame structure type 2 if the UE is configured with SRS parameters for DCI formats 0/1A/2B/2C/2D by higher-layer signalling.

Table 2 below shows an SRS request value for trigger type 1 in DCI format 4 in a 3GPP LTE/LTE-A system.

TABLE 2

| Value of SRS request field | Description |
| --- | --- |
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

Table 3 below further describes additions related to SRS transmission in a 3GPP LTE/LTE-A system.

TABLE 3

The serving cell specific SRS transmission bandwidths CSRS are configured by higher layers. The allowable values are given in subclause 5.5.3.2 of [3].
The serving cell specific SRS transmission sub-frames are configured by higher layers. The allowable values are given in subclause 5.5.3.3 of [3].
For a TDD serving cell, SRS transmissions can occur in UpPTS and uplink subframes of the UL/DL configuration indicated by the higher layer parameter subframeAssignment for the serving cell.
When closed-loop UE transmit antenna selection is enabled for a given serving cell for a UE that supports transmit antenna selection, the index $a(n_{SRS})$, of the UE antenna that transmits the SRS at time $n_{SRS}$ is given by
$a(n_{SRS}) = n_{SRS}$ mod 2, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \text{mod} 2 & \text{whenK is even} \\ n_{SRS} \text{mod} 2 & \text{whenK is odd} \end{cases},$$

$$\beta = \begin{cases} 1 & \text{where K mod } 4 = 0 \\ 0 & \text{otherwise} \end{cases}$$

when frequency hopping is enabled ((i.e. $b_{hop} < B_{SRS}$),
where values $B_{SRS}$, $b_{hop}$, $N_b$, and $n_{SRS}$ are given in subclause 5.5.3.2 of [3], and $$K = \prod_{b'=b_{hop}}^{B_{SRS}} N_b \text{ (where } N_{b_{hop}} = 1 \text{ regardless of the } N_b \text{ value), except when a single}$$

SRS transmission is configured for the UE. If a UE is configured with more than one serving cell, the UE is not expected to transmit SRS on different antenna ports simultaneously.
A UE may be configured to transmit SRS on Np antenna ports of a serving cell where Np may be configured by higher layer signalling. For PUSCH transmission mode 1 $N_p \in \{0, 1, 2, 4\}$ and for PUSCH transmission mode 2 $N_p \in \{0, 1, 2\}$ with two antenna ports configured for PUSCH and $N_p \in \{0, 1, 4\}$ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell.
The SRS transmission bandwidth and starting physical resource block assignment are the same for all the configured antenna ports of a given serving cell.
A UE not configured with multiple TAGs shall not transmit SRS in a symbol whenever SRS and PUSCH transmissions happen to overlap in the same symbol.
For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE.
If a UE is not configured with multiple TAGs, or if a UE is configured with multiple TAGs and SRS and PUCCH format 2/2a/2b happen to coincide in the same subframe in the same serving cell,
The UE shall not transmit type 0 triggered SRS whenever type 0 triggered SRS and PUCCH format 2/2a/2b transmissions happen to coincide in the same subframe;
The UE shall not transmit type 1 triggered SRS whenever type 1 triggered SRS and PUCCH format 2a/2b or format 2 with HARQ-ACK transmissions happen to coincide in the same subframe;
The UE shall not transmit PUCCH format 2 without HARQ-ACK whenever type 1 triggered SRS and PUCCH format 2 without HARQ-ACK transmissions happen to coincide in the same subframe.
If a UE is not configured with multiple TAGs, or if a UE is configured with multiple TAGs and SRS and PUCCH happen to coincide in the same subframe in the same serving cell,
The UE shall not transmit SRS whenever SRS transmission and PUCCH transmission carrying HARQ-ACK and/or positive SR happen to coincide in the same subframe if the parameter ackNackSRS-SimultaneousTransmission is FALSE;
For FDD-TDD and primary cell frame structure 1, the UE shall not transmit SRS in a symbol whenever SRS transmission and PUCCH transmission carrying HARQ-ACK TABLE 3-continued and/or positive SR using shortened format as defined in subclauses 5.4.1 and 5.4.2A of [3] happen to overlap in the same symbol if the parameter ackNackSRS-SimultaneousTransmission is TRUE.
Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE.
A UE not configured with multiple TAGs shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in the same subframe.
In UpPTS, whenever SRS transmission instance overlaps with the PRACH region for preamble format 4 or exceeds the range of uplink system bandwidth configured in the serving cell, the UE shall not transmit SRS.
The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell UE shall transmit HARQ-ACK and SR using the shortened PUCCH format as defined in subclauses 5.4.1 and 5.4.2A of [3] where the HARQ-ACK or the SR symbol corresponding to the SRS location is punctured.
This shortened PUCCH format shall be used in a cell specific SRS subframe of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for the transmission of HARQ-ACK and SR.
Trigger type 0 SRS configuration of a UE in a serving cell for SRS periodicity, $T_{SRS}$, and SRS subframe offset, $T_{offset}$, is defined in Table 8.2-1 and Table 8.2-2, for FDD and TDD serving cell, respectively. The periodicity $T_{SRS}$ of the SRS transmission is serving cell specific and is selected from the set {2, 5, 10, 20, 40, 80, 160, 320} ms or subframes.
For the SRS periodicity $T_{SRS}$ of 2 ms in TDD serving cell, two SRS resources are configured in a half frame containing UL subframe(s) of the given serving cell.
Type 0 triggered SRS transmission instances in a given serving cell for TDD serving cell with $T_{SRS} > 2$ and for FDD serving cell are the subframes satisfying
$(10 \cdot n_f + k_{SRS} - T_{offset})$ mod $T_{SRS} = 0$,, where for FDD $k_{SRS} = \{0, 1, , , , 0\}$ is the subframe index within the frame, for TDD serving cell ksRs is defined in Table 8.2-3. The SRS transmission instances for TDD serving cell with $T_{SRS} = 2$ are the subframes satisfying $k_{SRS} - T_{offset}$.
For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HarqReferenceConfig-r12 as a downlink subframe unless the UE transmits PUSCH in the same subframe.
Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set {2, 5, 10} ms or subframes.
For the SRS periodicity $T_{SRS,1}$ of 2 ms in TDD serving cell, two SRS resources are configured in a half frame containing UL subframe(s) of the given serving cell.
A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.
A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.
A UE configured for type 1 triggered SRS transmission on serving cell c upon detection of a positive SRS request in subframe n of serving cell c shall commence SRS transmission in the first subframe satisfying n + k,k ≥ 4 and
$(10 \cdot n_f + k_{SRS} - T_{offset,1})$ mod $T_{SRS,1} = 0$ for TDD serving cell c with $T_{SRS,1} > 2$ and for FDD serving cell c,
$(k_{SRS} - T_{offset,1})$mod 5 = 0 for TDD serving cell c with $T_{SRS,1} = 2$
where for FDD serving cell c $k_{SRS} = \{0, 1, \ldots, 9\}$ is the subframe index within the frame $n_f$, for TDD serving cell c $k_{SRS}$ is defined in Table 8.2-3.
A UE configured for type 1 triggered SRS transmission is not expected to receive type 1 SRS triggering events associated with different values of trigger type 1 SRS transmission parameters, as configured by higher layer signalling, for the same subframe and the same serving cell.
For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe.
A UE shall not transmit SRS whenever SRS and a PUSCH transmission corresponding to a Random Access Response Grant or a retransmission of the same transport block as part of the contention based random access procedure coincide in the same subframe.

Table 4 below shows a subframe offset $T_{offset}$ and UE-specific SRS periodicity $T_{SRS}$ for trigger type 0 in FDD.

TABLE 4

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Table 5 below shows a subframe offset $T_{offset}$ and UE-specific SRS periodicity $T_{SRS}$ for trigger type 0 in TDD.

TABLE 5

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 6

| SRS Configuration Index $I_{SRS}$ | SRS Periodicity (ms) | SRS Subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

Table 7 shows $K_{SRS}$ for TDD.

TABLE 7

| | subframe index n | | | | | | | | | |
|---|---|---|---|---|---|---|---|---|---|---|
| | 0 | 1 | | 2 | 3 | 4 | 5 | 6 | | 7 | 8 | 9 |
| | | 1st symbol of UpPTS | 2nd symbol of UpPTS | | | | | 1st symbol of UpPTS | 2nd symbol of UpPTS | | | |
| $k_{SRS}$ in case UpPTS length of 2 symbols | 0 | 0 | 1 | 2 | 3 | 4 | 5 | 5 | 6 | 7 | 8 | 9 |
| $k_{SRS}$ in case UpPTS length of 1 symbol | | 1 | | 2 | 3 | 4 | | 6 | | 7 | 8 | 9 |

Table 8 below shows a subframe offset $T_{offset,1}$ and UE-specific SRS periodicity $T_{SRS,1}$ for trigger type 1 in FDD.

TABLE 8

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-31 | reserved | reserved |

Table 9 below shows a subframe offset $T_{offset,1}$ and UE-specific SRS periodicity $T_{SRS,1}$ for trigger type 1 in TDD.

TABLE 9

| SRS Configuration Index $I_{SRS}$ | SRS Periodicity (ms) | SRS Subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |

TABLE 9-continued

| SRS Configuration Index $I_{SRS}$ | SRS Periodicity (ms) | SRS Subframe Offset |
|---|---|---|
| 15-24 | 10 | $I_{SRS}$-15 |
| 25-31 | reserved | reserved |

Analog Beamforming

In a Millimeter Wave (mmW) system, since a wavelength is short, a plurality of antennas can be installed in the same area. That is, considering that the wavelength in the 30 GHz band is 1 cm, a total of 64 (8×8) antenna elements can be installed in a 4 cm by 4 cm panel at intervals of 0.5 lambda (wavelength) in the case of a 2-dimensional array. Therefore, in the mmW system, it is attempted to improve the coverage or throughput by increasing the beamforming (BF) gain using multiple antenna elements.

In this case, if each antenna element includes a transceiver unit (TXRU) to enable adjustment of transmit power and phase per antenna element, each antenna element can perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, such an analog beamforming method is disadvantageous in that frequency selective beaming is impossible because only one beam direction is generated over the full band.

As an intermediate form of digital beamforming (digital BF) and analog beamforming (analog BF), hybrid beamforming (hybrid BF) with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 2A:
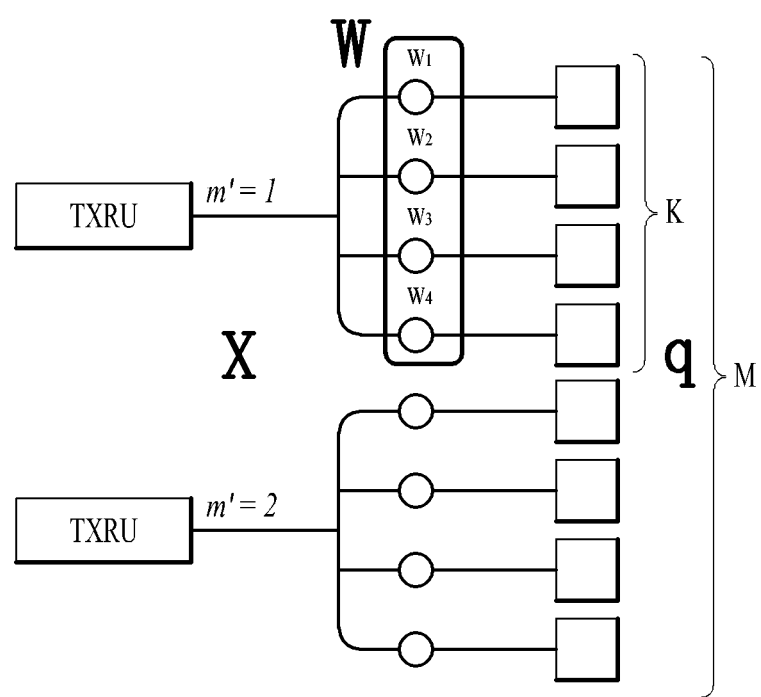
FIG. 2a is a diagram showing TXRU virtualization model option 1 (sub-array model) and FIG. 2b is a view showing TXRU virtualization model option 2 (full connection model).
Figure 2B:
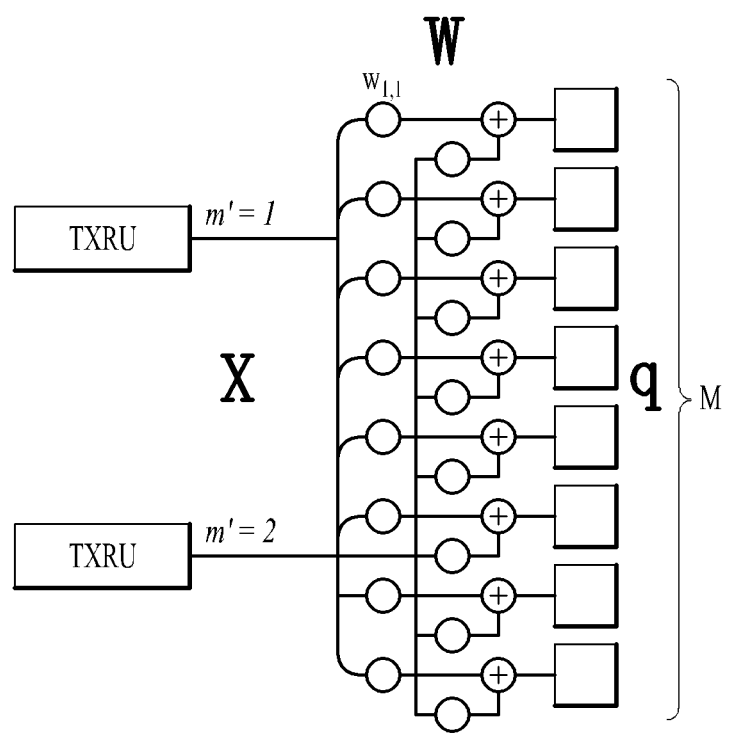

FIG. 2a is a view showing TXRU virtualization model option 1 (sub-array model) and FIG. 2b is a view showing TXRU virtualization model option 2 (full connection model).

FIGS. 2a and 2b show representative examples of a method of connecting TXRUs and antenna elements. Here, the TXRU virtualization model shows a relationship between TXRU output signals and antenna element output signals. FIG. 2a shows a method of connecting TXRUs to sub-arrays. In this case, one antenna element is connected to one TXRU. In contrast, FIG. 2b shows a method of connecting all TXRUs to all antenna elements. In this case, all antenna elements are connected to all TXRUs. In FIGS. 2a and 2b, W indicates a phase vector weighted by an analog phase shifter. That is, W is a major parameter determining the direction of the analog beamforming. In this case, the mapping relationship between CSI-RS antenna ports and TXRUs may be 1-to-1 or 1-to-many.

Hybrid Beamforming

Figure 3:
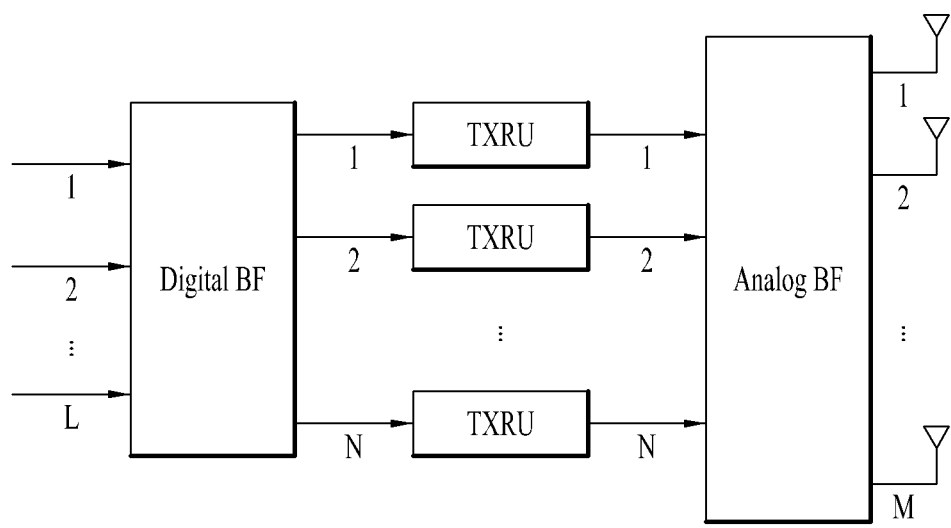
FIG. 3 is a block diagram for hybrid beamforming.

FIG. 3 is a block diagram for hybrid beamforming.

Figure 4:
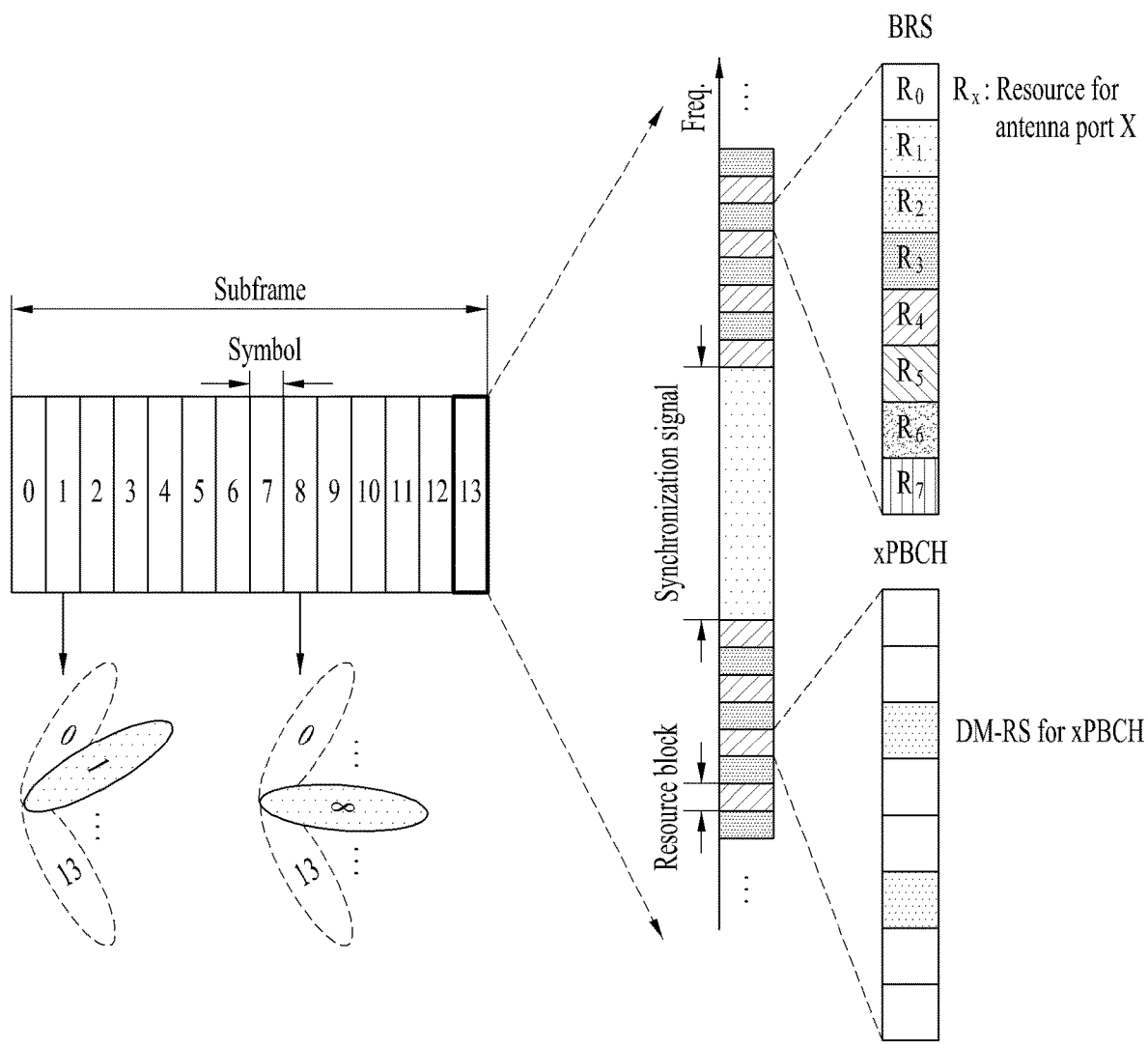
FIG. 4 is a diagram showing an example of beams mapped to BRS symbols in hybrid beamforming.

If a plurality of antennas is used in a new RAT system, a hybrid beamforming scheme which is a combination of digital beamforming and analog beamforming may be used. At this time, analog beamforming (or RF beamforming) means operation of performing precoding (or combining) at an RF stage. In the hybrid beamforming scheme, each of a baseband stage and an RF stage uses a precoding (or combining) method, thereby reducing the number of RF chains and the number of D/A (or A/D) converters and obtaining performance similar to performance of digital beamforming. For convenience of description, as shown in FIG. 4, the hybrid beamforming structure may be expressed by N transceivers (TXRUs) and M physical antennas. Digital beamforming for L data layers to be transmitted by a transmission side may be expressed by an N×L matrix, N digital signals are converted into analog signals through TXRUs and then analog beamforming expressed by an M×N matrix is applied.

FIG. 3 shows a hybrid beamforming structure in terms of the TXRUs and physical antennas. At this time, in FIG. 3, the number of digital beams is L and the number of analog beams is N. Further, in the new RAT system, a base station is designed to change analog beamforming in symbol units, thereby supporting more efficient beamforming for a UE located in a specific region. Furthermore, in FIG. 3, when N TXRUs and M RF antennas are defined as one antenna panel, up to a method of introducing a plurality of antenna panels, to which independent hybrid beamforming is applicable, is being considered in the new RAT system.

When the base station uses a plurality of analog beams, since an analog beam which is advantageous for signal reception may differ between UEs, the BS may consider beam sweeping operation in which the plurality of analog beams, which will be applied by the BS in a specific subframe (SF), is changed according to symbol with respect to at least synchronization signals, system information, paging, etc. such that all UEs have reception opportunities.

FIG. 4 is a view showing an example of beams mapped to BRS symbols in hybrid beamforming.

FIG. 4 shows the beam sweeping operation with respect to synchronization signals and system information in a downlink (DL) transmission procedure. In FIG. 4, a physical resource (or physical channel) through which the system information of the new RAT system is transmitted in a broadcast manner is named xPBCH (physical broadcast channel). At this time, analog beams belonging to different antenna panels may be simultaneously transmitted within one symbol, and, in order to measure a channel per analog beam, as shown in FIG. 4, a method of introducing a beam reference signal (BRS) which is an RS transmitted by applying a single analog beam (corresponding to a specific analog panel) may be considered. The BRS may be defined with respect to a plurality of antenna ports and each antenna port of the BRS may correspond to a single analog beam. Although the RS used to measure the beam is given BRS in FIG. 5, the RS used to measure the beam may be named another name. At this time, unlike the BRS, a synchronization signal or xPBCH may be transmitted by applying all analog beams of an analog beam group, such that an arbitrary UE properly receives the synchronization signal or xPBCH.

Figure 5:
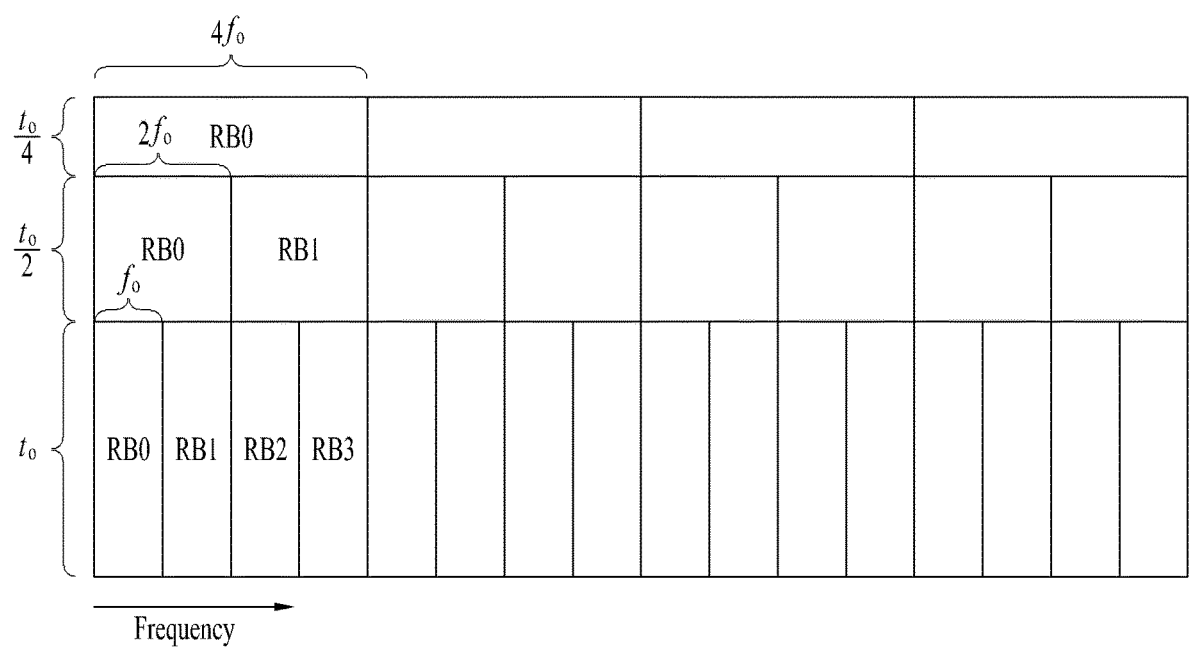
FIG. 5 is a diagram showing symbol/sub-symbol alignment between different numerologies.

FIG. 5 is a view showing symbol/sub-symbol alignment between different numerologies.

New RAT(NR) Numerology Characteristics

In NR, a method of supporting scalable numerology is being considered. That is, a subcarrier spacing of NR is (2n×15) kHz and n is an integer. From the nested viewpoint, a subset or a superset (at least 15, 30, 60, 120, 240, and 480 kHz) is being considered as a main subcarrier spacing. Symbol or sub-symbol alignment between different numerologies was supported by performing control to have the same CP overhead ratio.

In addition, numerology is determined in a structure for dynamically allocating time/frequency granularity according to services (eMMB, URLLC and mMTC) and scenarios (high speed, etc.).

Bandwidth Dependent/Non-Dependent Sequence for Orthogonalization

In an LTE system, an SRS is differently designed according to sounding bandwidth. That is, a computer-generated sequence is used when a sequence having a length 24 or less is designed and a Zadoff-Chu (ZC) sequence is used in the case of 36 (3RB) or more. The greatest advantages of the ZC sequence are that the ZC sequence has low PAPR or low cubic metric and simultaneously has ideal autocorrelation and low cross-correlation properties. However, in order to satisfy such properties, the lengths (indicating sounding bandwidth) of necessary sequences should be the same. Accordingly, in order to support UEs having different sounding bandwidths, allocation to different resource regions is necessary. In order to minimize channel estimation performance deterioration, IFDMA comb structures have different sounding bandwidths to support orthogonality of UEs for performing simultaneous transmission. If such a transmission comb (TC) structure is used in a UE having small sounding bandwidth, a sequence length may become less than a minimum sequence length (generally, a length of 24) having orthogonality and thus TC is limited to 2. If the same TC is used in the same sounding resource, a dimension for providing orthogonality is necessary, thereby leading to use of CDM using cyclic shift.

Meanwhile, there are sequences which have PAPR and correlation performances slightly lower than those of ZC sequences but are capable of being subjected to resource mapping regardless of sounding bandwidth, such as a Golay sequence and a pseudo random (PN) sequence. In the case of a Golay sequence, when the autocorrelation values of certain sequences a and b are $A_a$ and $A_b$, a and b, the sum of the autocorrelation values of which satisfies the following condition, are referred to as a Golay complementary sequence pair $(A_a+A_b=\delta(x))$.

Figure 6:
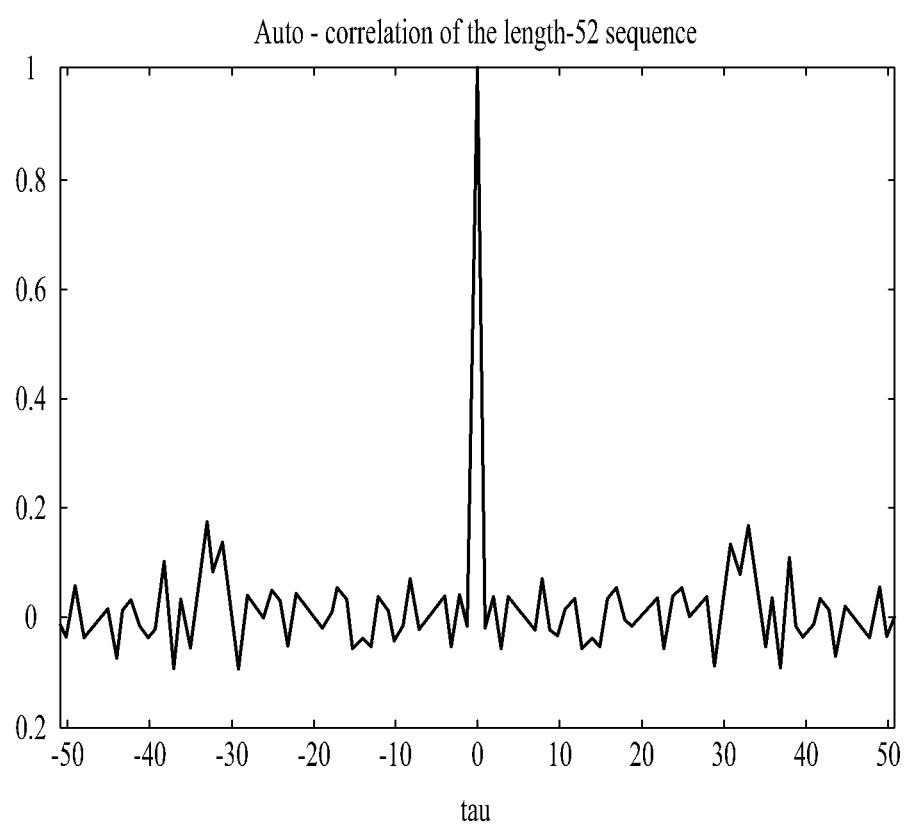
FIG. 6 is a diagram showing performance of 52-length autocorrelation using two 26-length Golay Complementary Sequence pairs.

For example, when length-26 Golay sequences a and b are a=[1 −1 1 1 −1 −1 1 −1 −1 −1 −1 1 −1 1 −1 −1 −1 −1 1 1 −1 −1 −1 1 −1 1 1] and b=[−1 1 −1 −1 −1 1 1 −1 1 1 1 1 −1 −1 −1 −1 −1 −1 1 1 −1 −1 −1 1 −1 1 1], the two sequences are concatenated to configure a 52-length sequence. In addition, when 0 is mapped to four resource elements (REs) of both sides, auto-correlation performance shown in FIG. 7 may be obtained. FIG. 6 is a view showing performance of 52-length autocorrelation using two 26-length Golay Complementary Sequence pairs.

Figure 7:
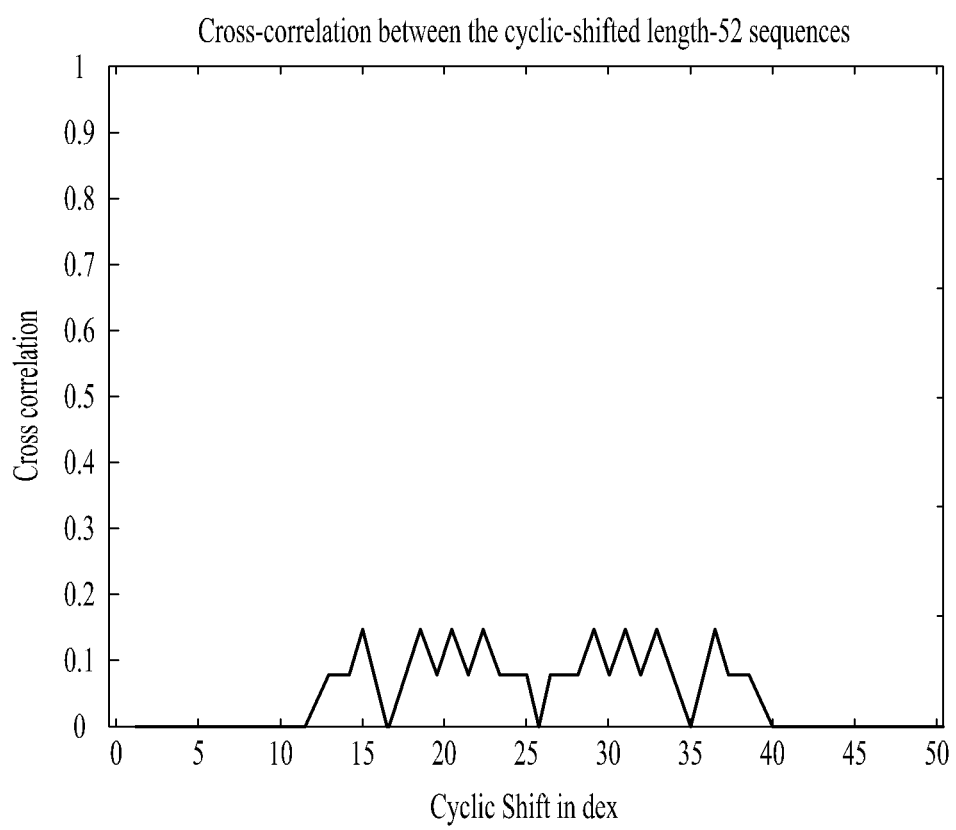
FIG. 7 is a diagram showing cross-correlation between sequences having different CSs in a 52-length Golay sequence.

FIG. 7 is a view showing cross-correlation between sequences having different CSs in a 52-length Golay sequence.

A plurality of cyclic shifts (CSs) may be applied to the 52-length sequences to generate a plurality of Golay sequences. Cross-correlation between Golay sequences having different CSs is shown in FIG. 8.

FIG. 8 is a view showing cross-correlation and cubic-metric evaluations of ZC, Golay and PN sequences.

The cubic metrics (CMs) and cross-correlations of the ZC, Golay and PN sequences are calculated and compared when TC is 1, 2 or 4. Assumption for evaluation are as follows.

The sounding bandwidth is set to 4, 8, 12, 16, 20, 24, 32, 36, and 48 RBs (based on LTE SRS design).

Like the LTE system, 30-group number $u=(f_{gh}(n_s)+f_{ss})$ mod30 is determined as follows and $(f_{gh}(n_s)+f_{ss})$ is determined based on a cell ID. At this time, one base sequence v is selected in 4 RBs and two base sequence numbers v are selected in the others.

In the case of the Golay sequence, a 2-48-length truncated binary Golay sequence in an 802.16m system was used and a QPSK PN sequence was used as an independent bandwidth SRS design example. At this time, in order to represent 30 groups in the ZC sequence, the Golay sequence was generated using 30 CSs and 30 PN sequence were generated in Matlab.

Evaluation was performed using TC=1, 2 and 4.

In cubic metric evaluation, an over sampling factor (OSF) was set to 8 for better resolution.

Referring to FIG. 8(a), cross correlation performance was in order of ZC>Golay>PN sequence, and CM performance was in order of ZC>Golay>PN. In order to generate an SRS sequence for UL transmission, the ZC sequence has good performance as in the LTE system. However, in order to increase a degree of freedom in allocation of sounding bandwidth to each UE, the Golay sequence or the PN sequence may not be excluded as SRS sequence candidates of New RAT.

Figure 9:
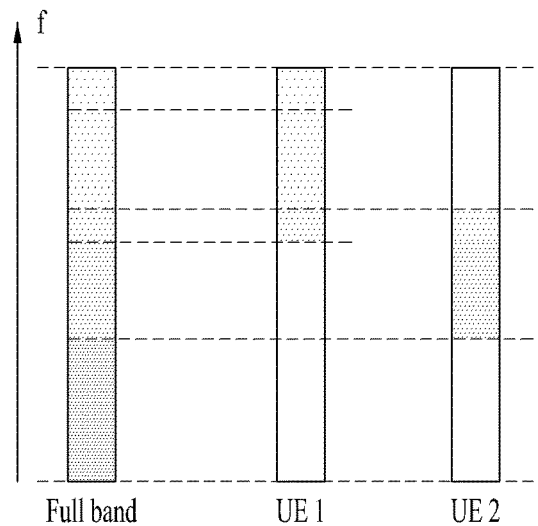
FIG. 9 is a diagram illustrating an exemplary truncated ZC sequence.

FIG. 9 is a diagram illustrating an exemplary truncated ZC sequence.

FIG. 9 illustrates an example of a position dependent sequence. The truncated ZC sequence is considered for a method of generating a representative sequence among position dependent sequences. First, a mother sequence is generated over a maximum UL system bandwidth (BW) and an eNB allocates a part of the mother sequence to each UE according to an SRS resource location and an SRS BW so that each UE generates a corresponding SRS sequence and transmits an SRS. Particularly, when partial overlapping is permitted, the eNB may allocate the same sequence to UEs to which the same frequency region is allocated in any region. In this case, if different orthogonal CDM (e.g., CS value) is applied, theoretically, a low-correlated sequence may be applied. For example, a sequence may be indicated by Equation 1.

$$Z(n) = e^{-j\frac{\pi q n(n+1)}{N}}, 0 \leq n \leq N-1 \qquad \text{[Equation 1]}$$

where $N$ is the length and $q$ is the root.

The first $M$ ($M < N$) length subsequence of $Z$ is $z_1 = \{Z(s), Z(s+1), \ldots, Z(s+M-1)\}$ namely $z_1(k) = e^{-j\frac{\pi q(k+s)(k+s+1)}{N}}, 0 \leq k \leq M-1.$ The second $M$ length subsequence of $Z$ is $z_2 = \{Z(s+\Delta s), Z(s+\Delta s+1), \ldots, Z(s+\Delta s+M-1)\}$ namely $z_2(k) = e^{-j\frac{\pi q(k+s+\Delta s)(k+s+\Delta s+1)}{N}}, 0 \leq k \leq M-1.$ Then we have $z_2(k) = e^{-j\frac{\pi q(\Delta s^2 + 2\Delta s \cdot s + \Delta s)}{N}} e^{-j\frac{\pi q(2\Delta s \cdot k)}{N}} e^{-j\frac{\pi q(k+s)(k+s+1)}{N}}$ $= e^{-j\frac{\pi q(\Delta s^2 + 2\Delta s \cdot s + \Delta s)}{N}} e^{-j\frac{\pi q(2\Delta s \cdot k)}{N}} z_1(k)$ In the above characteristics, since truncated ZC sequences located in different frequency regions vary in phase only, PAPRs after the sequences are changed on a time axis are theoretically equal. A cross correlation of an overlapping part of $z_1(k)$ and $z_2(k)$ may be indicated by Equation 2.

$$z_1(k)e^{j\alpha k} * z_2(k)e^{j\beta k} = \qquad \text{[Equation 2]}$$

$$\sum_k^N z_1(k)z_2(k+k') = \sum_k^N e^{-j\frac{\pi q(\Delta s^2 + 2\Delta s \cdot s + \Delta s)}{N}}$$

-continued $$e^{-j\frac{\pi q(2\Delta s \cdot (k-k'))}{N}} z_1(k) z_1^*(k+k') e^{j\alpha k} e^{-j\beta k}$$

When $k' = 0$, $$\sum_k^N z_1(k) z_2(k) =$$

$$\sum_k^N e^{-j\frac{\pi q(\Delta s^2 + 2\Delta s \cdot s + \Delta s)}{N}} e^{-j\frac{\pi q(2\Delta s \cdot k)}{N}} z_1(k) z_1^*(k) e^{j\alpha k} e^{-j\beta k}$$

$$\sum_k^N z_1(k) z_2(k) =$$

$$\sum_k^N e^{-j\frac{\pi q(\Delta s^2 + 2\Delta s \cdot s + \Delta s)}{N}} e^{-j\frac{\pi q(2\Delta s \cdot k)}{N}} z_1(k) z_1^*(k) e^{j\alpha k} e^{-j\beta k} =$$

$$e^{-j\frac{\pi q(\Delta s^2 + 2\Delta s \cdot s + \Delta s)}{N}} \sum_k^N e^{-j\frac{\pi q(2\Delta s \cdot k)}{N}} e^{j\alpha k} e^{-j\beta k}$$

That is, if a CS value, α, and β differ, sequences may be seen as almost being quasi-orthogonal. Even when a TC and a TC offset are applied, a sequence corresponding to the TC selected from among all sequences may be used as follows. Then, the eNB allocate the same sequence to the same resource with respect to UEs with the same sequence generation parameters (e.g., TC and TC offset) in the same frequency region. Then, sequences are low-correlated by applying different CSs.

Figure 10:
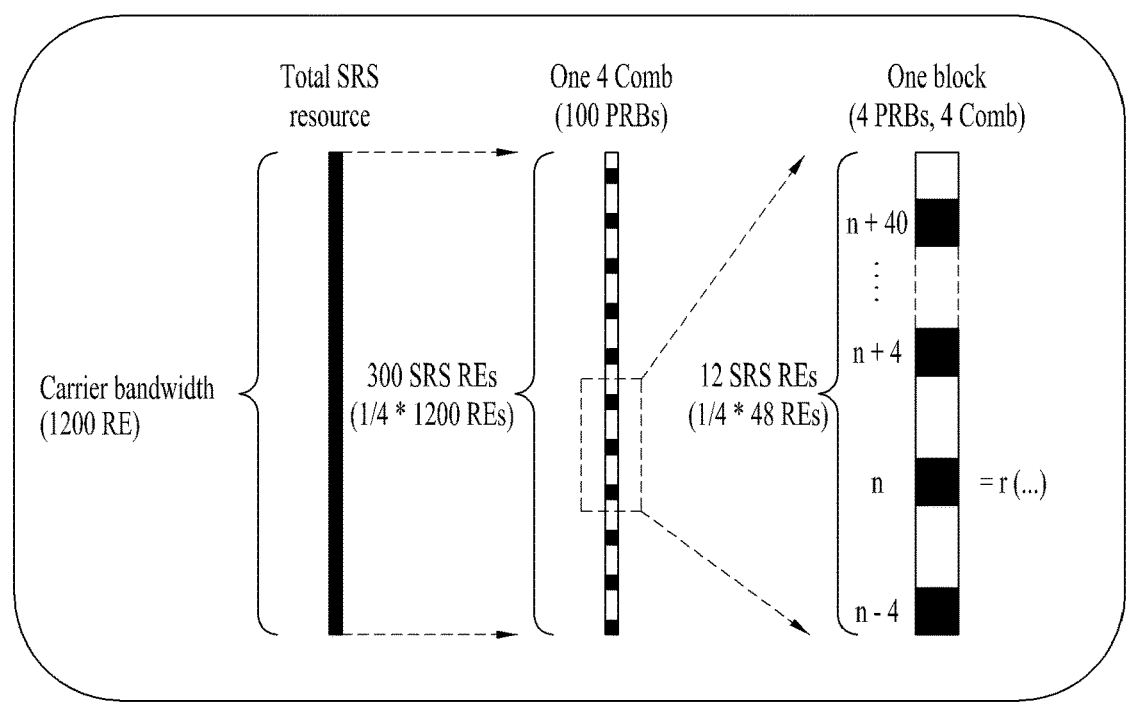
FIG. 10 is a diagram illustrating an SRS sequence generation method according to a TC.

FIG. 10 is a diagram illustrating an SRS sequence generation method according to a TC.

The SRS sequence generation method illustrated in FIG. 10 advantageously has good SRS allocation flexibility. However, since different CSs should always be applied to overlapped resources, efficiency of resource allocation capability is worse than a short block concatenated method.

Table 10 below shows methods of generating an SRS sequence.

TABLE 10

To down-select one method for NR SRS sequence generation based on at least the following alternatives:
Alt-1: SRS sequence is a function of the sounding bandwidth and does not depend on the sounding bandwidth position or the PRB position.
Sequence design and other design details are FFS.
Alt-2: SRS sequence is a function of the sounding bandwidth position or the PRB position.
Sequence design and other design details are FFS.
Taking into account metrics such as PAPR, capacity/flexibility, etc.
Other parameters, if any, determining SRS sequence are FFS
(e.g. SRS sequence ID)

For SRS sequence generation methods in NR, the methods of Alt-1 and Alt-2 in Table 10 may be considered. Alt-1 is the method of configuring an SRS BW and then generating a sequence using the SRS BW. Herein, the sequence is generated regardless of an SRS resource starting position. An example of Alt-1 may be an LTE SRS sequence generation and mapping method.

A sequence that is a function of the sounding BW indicates a ZC sequence. That is, in the ZC sequence $$x_q(m) = e^{-j\frac{\pi q m(m+1)}{N_{ZC}^{RS}}}$$

where $0 \leq m \leq N_{ZC}^{RS}-1$, $N_{ZC}^{RS}$ seen as a function of BW. Sequences that can be generated regardless of the SRS BW may be PN-based sequences or Golay-based sequences. Since generation of the ZC sequence is not changed according to an SRS mapping position, the ZC sequence is one of sequences satisfying the method of Alt-1 in Table 10.

Figure 11:
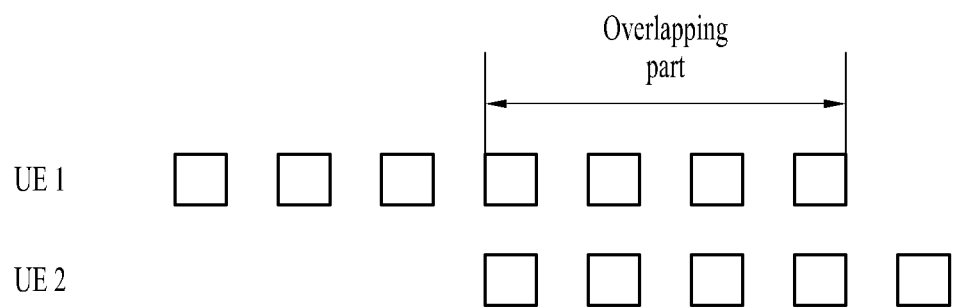
FIG. 11 is a diagram illustrating difficulty in maintaining orthogonality in an overlapping part in free frequency mapping while a ZC sequence is used.

FIG. 11 is a diagram illustrating difficulty in maintaining orthogonality in an overlapping part in free frequency mapping while a ZC sequence is used.

An LTE system allows various SRS BWs to be provided to each UE using the ZC sequence and uses a TC to mitigate inter-cell interference in order to reduce degradation of channel estimation performance. The LTE system also uses a CS to maintain orthogonality between ports. This structure is a useful sequence design method that has the lowest PAPR and is thus capable of providing much transmission power to cell-edge UEs. However, this structure decreases the degree of freedom in resource allocation. In particular, in order to allow UEs having different SRS BWs to overlap with each other, it is necessary to use FDM, that is, different TCs.

NR requires a method of maintaining orthogonality even during overlapping in one or plural partial bands caused by presence of more orthogonal UEs and transmission and reception points (TRPs). One more consideration in this requirement is determining up to which degree overlapping should be permitted. When overlapping is configured to permit the degree of freedom, if a method of maintaining orthogonality using the Golay or PN sequence is used, a sequence of an overlapping part may be shared and different CSs may be provided. This method indicates that a sequence is differently generated according to an SRS arrangement position (this method is considered as an example of Alt-2 in Table 10).

As an example, the Golay sequence should have a structure in which, when a different BW is allocated to each UE, the sequence is nested from an overlapped position. That is, orthogonality may be maintained when resources with a nested structure should be allocated to UEs having different BWs at a specific frequency location i. That is, a sounding sequence of UE-1 may be [G(u,i) G(u,i+2) G(u,i+4) G(u,i+6)] and a sounding sequence of UE-2 may be [G(u,i) G(u,i+2) G(u,i+4) G(u,i+6) G(u,i+8) G(u,i+10) G(u,i+12) G(u,i+14)]×e(−2jπα(k)). Herein, G(u) is a time-domain cyclic shift (CDM) of a truncated Golay sequence. This characteristic implies that the sequence is an SRS resource position dependent sequence and corresponds to a design method satisfying the method of Alt-2 in Table 10.

However, if the ZC sequence is used, this method is not available. If two UEs having different SRS BWs partially overlap, sequences of an overlapping part cannot be orthogonal. This is because an SRS sequence is a BW dependent sequence. To permit orthogonality, a method of permitting overlapping corresponding only to a certain specific block (which is also called an SRS block) and configuring a sequence in a block unit may be considered. Therefore, a concatenated SRS block that generates a sequence in units of specific blocks and representing an SRS BW as a group of such blocks may be considered Hereinafter, a block described in the present disclosure is a length unit in the frequency domain to transmit an SRS and may be variously referred to as SRS block length, sounding length, and the like.

Figure 12:
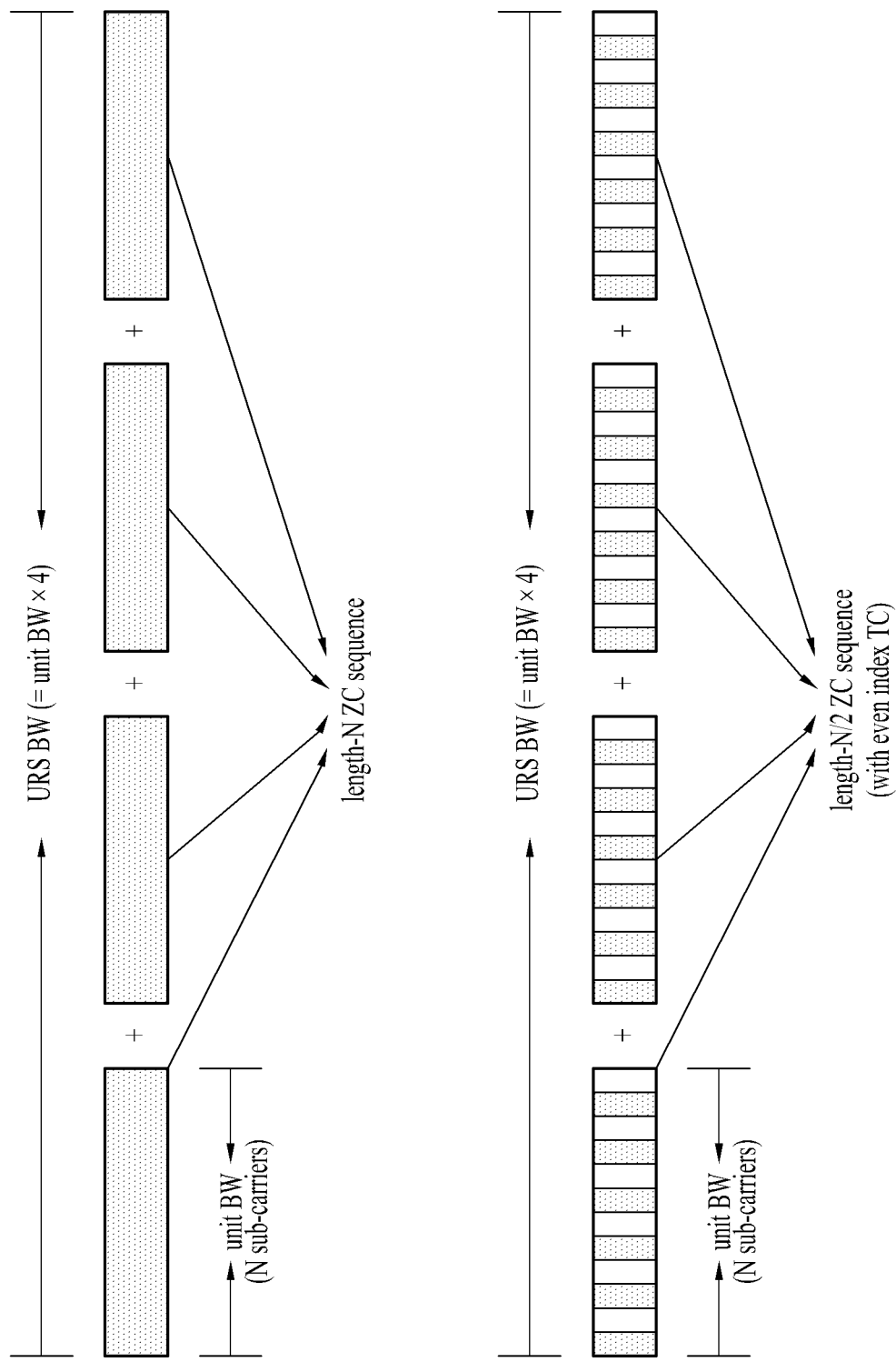
FIG. 12 is a diagram illustrating the structure of a concatenated SRS block configured in units of multiple ZC sequences.

FIG. 12 is a diagram illustrating the structure of a concatenated SRS block configured in units of multiple ZC sequences.

In the structure illustrated in FIG. 12, if an eNB is configured to perform SRS resource allocation based on a unit BW starting point and orthogonally generate a BW dependent sequence allocated to the unit BW for each UE, sequences may be generated regardless of position based on the unit BW. As an example, when UE 1 and UE 2 have different BWs, if sequences are orthogonally generated per unit BW between the two UEs, various starting positions may be configured for the UEs based on the unit BW.

Figure 13:
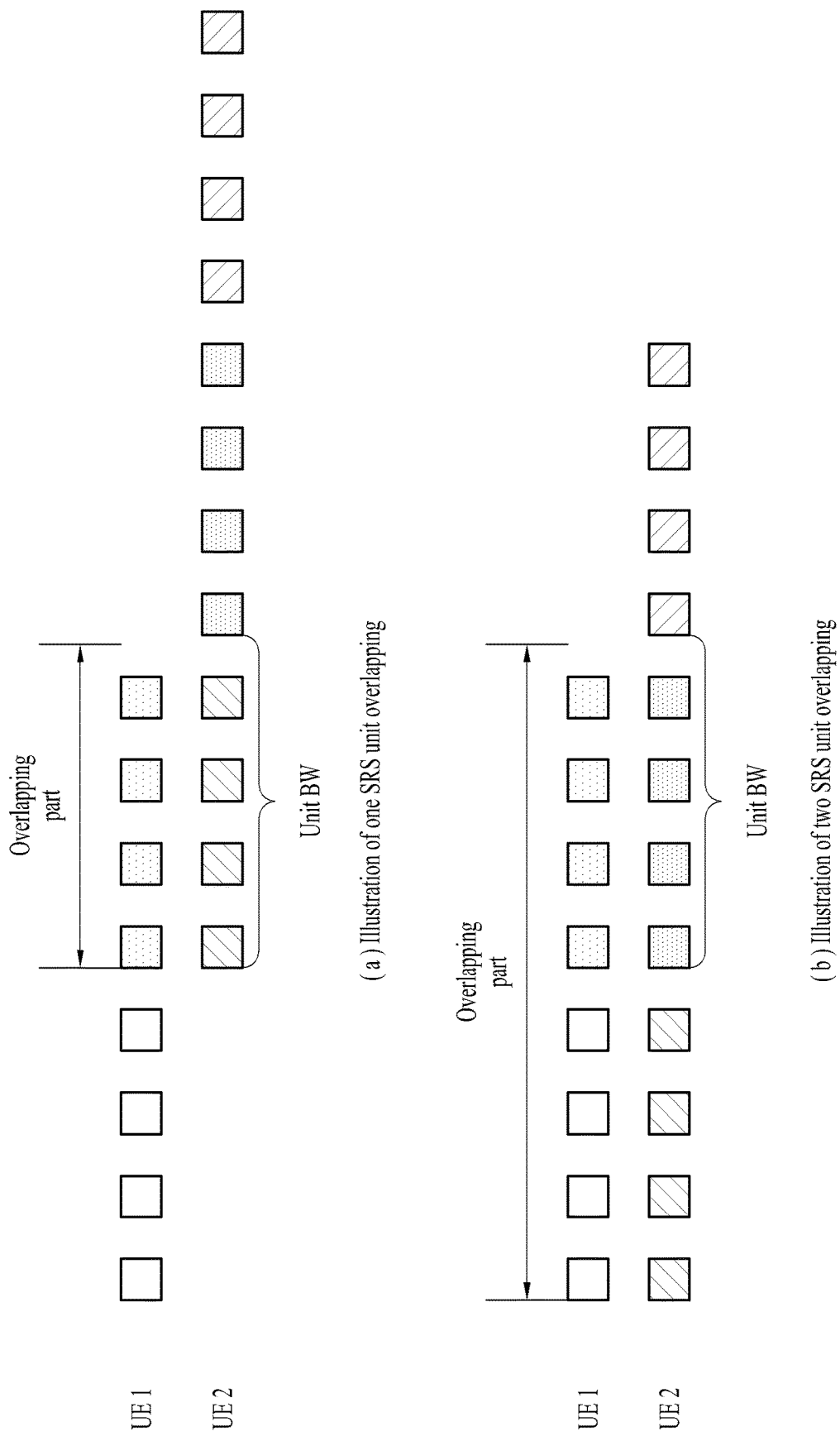
FIG. 13 is a diagram illustrating SRS unit overlapping.

FIG. 13 is a diagram illustrating SRS unit overlapping.

FIG. 13(*a*) illustrates overlapping in one SRS unit and FIG. 13(*b*) illustrates overlapping in two SRS units.

A resource mapping starting position may be freely designated in an SRS BW unit. This structure may easily represent an SRS BW configuration by the number of SRS BW units. That is, in FIG. 13, the BW of UE 1 may be represented by two SRS units and the SRS BW of UE 2 may consist of 3 SRS units.

Therefore, a concatenated SRS structure may be a structure that satisfies the method f Alt-1 that may use the ZC sequence and freely allocate an SRS to each UE within the unit. In this structure, if a root value of the ZC sequence differs according to an SRS arrangement position, a sequence satisfying the structure of Alt-2 may also be obtained.

However, there are some issues to be solved for SRS design considering a concatenated short sequence.

Since the short sequence is a BW dependent sequence, the number of UEs that may overlap with each other in one BW unit is limited. That is, when SRS BW unit length=4 RBs and TC=2, a length-24 ZC sequence may be generated per BW unit and 22 orthogonal sequences may be generated. That is, the eNB may orthogonally allocate up to 22 UEs in the BW unit. Therefore, when a large number of UEs are supported, resource allocation and sequences allocated to respective UEs need to be carefully designed in supporting overlapping.

Increased overhead: One UE may have a structure having a plurality of BW units. If overhead for one SRS BW configuration is L, overhead necessary for an SRS BW of the UE configured with M BW units is intuitively L*M (which is a feature of the method of Alt-2).

Figures 14, 15:
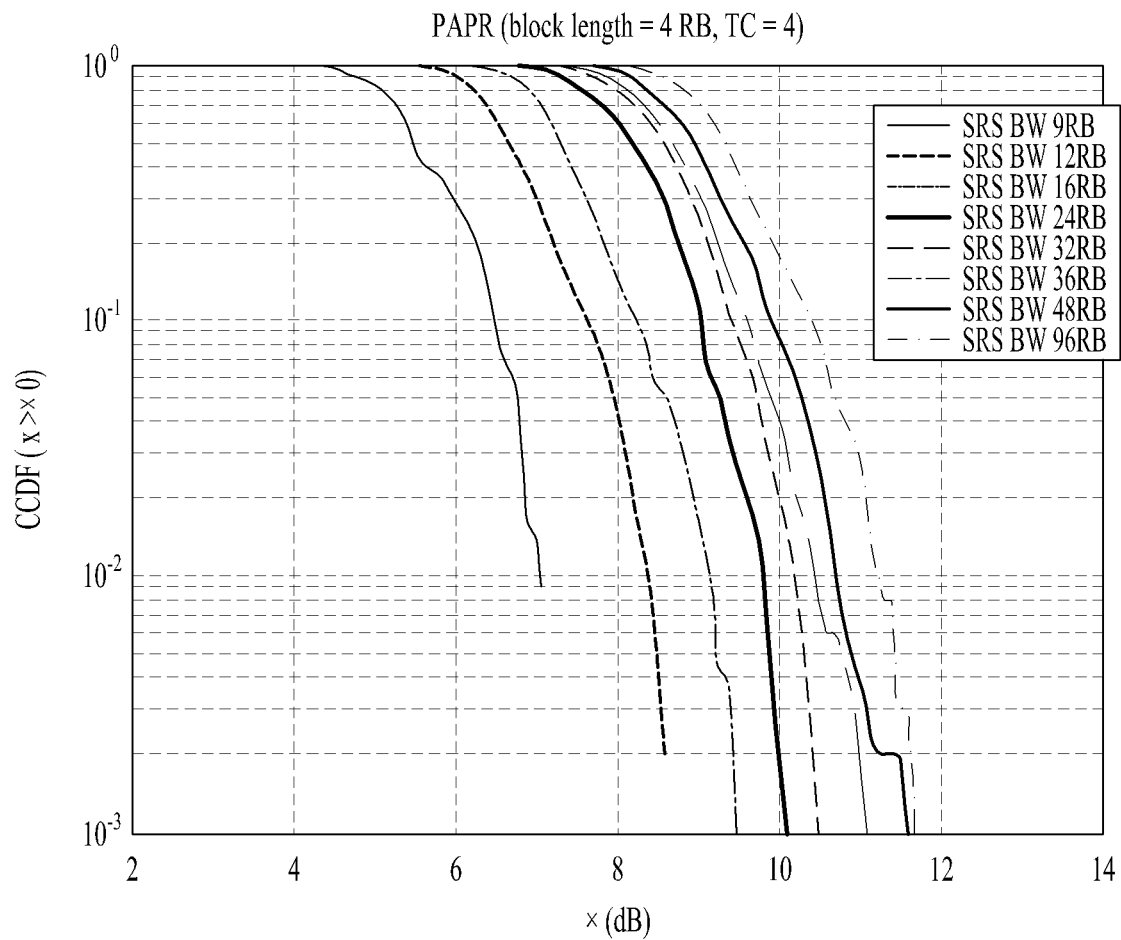
FIG. 14 is a diagram illustrating a ZC sequence (length $M_1$) and a CS index $n_i \in \{0, 1, \ldots, M_1-1\}$ of one block.
FIG. 15 is a diagram illustrating a PAPR when ZC sequence blocks having a fixed block length of 4 RBs are arranged over an SRS BW and FIG. 16 is a diagram illustrating a PAPR when an SRS BW consists of 96 RBs and a block length varies.

FIG. 14 is a diagram illustrating a ZC sequence (length $M_1$) and a CS index $n_i \in \{0, 1, \ldots, M_1-1\}$ of one block.

To allocate an SRS resource of a large number of UEs or units to which orthogonal SRS mapping is needed (i.e., UE TRPs or UE panels) in one block, different CS values may be provided to one block so that different CS values may be applied to one block. That is, as illustrated in FIG. 12, an SRS sequence may be mapped to blocks over an SRS BW so that one short block may have a different CS value.

In the example of FIG. 14, for a low correlation of UEs or UE TRPs having different CS indexes, a sequence length in a block and the length $M_1$ may be set to be equal. Therefore, more sequences having a low correlated property in one block may be generated.

Figure 16:
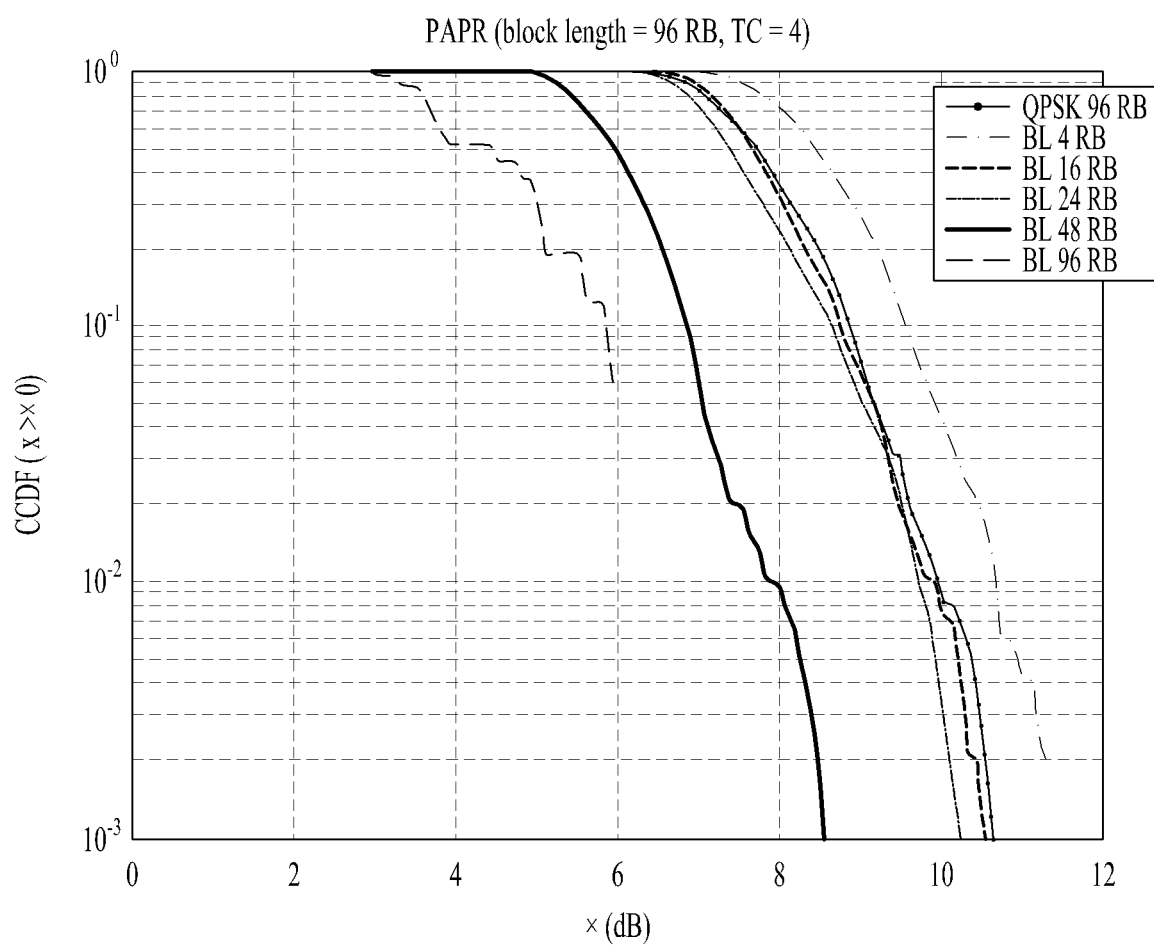

FIG. 15 is a diagram illustrating a PAPR when ZC sequence blocks having a fixed block length of 4 RBs are arranged over an SRS BW and FIG. 16 is a diagram illustrating a PAPR when an SRS BW consists of 96 RBs and a block length varies.

FIG. 15 illustrates an SRS BW dependent PAPR (block length=4 RBs, TC=4, ZC sequence, and IFFT=2048) and FIG. 16 illustrates a block dependent PAPR (SRS BW=96 RBs, TC=4, ZC sequence, and IFFT=2048).

FIG. 15 illustrates a PAPR when ZC sequence blocks having a fixed block length of 4 RBs are arranged over an SRS BW. If the SRS BW consists of 8 RBs, it may be appreciated that two blocks are configured. FIG. 16 illustrates a PAPR when an SRS BW consists of 96 RBs and a block length varies. That is, if the block length is 8 RBs, it may be appreciated that 12 blocks are configured.

From results illustrated in FIGS. 15 and 16, it may be appreciated that a PAPR increases as the number of blocks increases so that it is necessary to appropriately limit the number of blocks according to PAPR requirements of UEs.

Proposal 1

The eNB may allocate an SRS consisting of concatenated blocks according to a UL SRS capability in a total UL band to which the SRS is allocated. As an example of the UL SRS capability, the SRS may be allocated such that UEs in a specific UE group may have a block length for generating a UL SRS, i.e., the same block length, and partial or full overlapping may be permitted between the UEs. For orthogonality between UE groups having different block lengths, the SRS may be configured for the UE groups by frequency division multiplexing (FDM) (e.g., different TCs or TC offsets are applied).

The eNB may provide the UE with one or multiple combinations of the following information.

(1) A value indicating the length of one (SRS) block (e.g., an (SRS) block length index indicating the length of the (SRS) block, an SRS BW, and the number of (SRS) blocks allocated to the SRS BW)

(2) An allocation starting and/or ending position in the frequency domain of a resource of a block unit (e.g., in the case of a UE with a block length of 4 RBs and an SRS BW of 16, a starting position $k_0$ may be indicated as $k_0=4\times$ block_index or an ending position $k_1$ may be indicated as $k_1=4\times$block_index.)

(3) Sequence generation parameters for a resource allocated to a UE (e.g., a TC, a TC offset, a CS, and a root)

(4) Number of sequence generation parameter sets for a resource allocated to a UE (e.g. the number, n, of parameter sets {TC, TC offset, CS, root})

Figure 17:
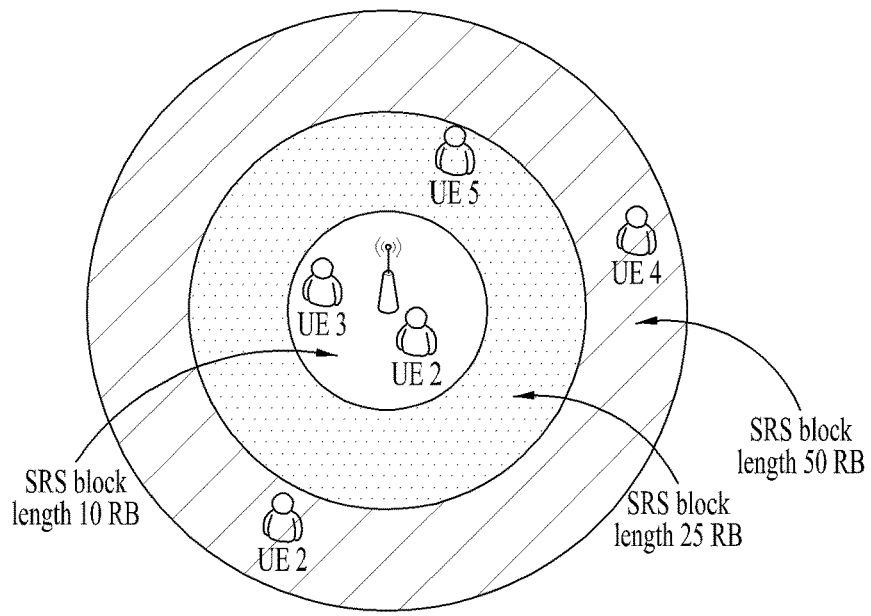
FIG. 17 is a diagram illustrating an (SRS) block length allocation method according to a link budget.

FIG. 17 is a diagram illustrating an (SRS) block length allocation method according to a link budget.

As an embodiment, after calculating and acquiring a DL link budget (e.g., UEs may calculate reference signal received power (RSRP) using DL RSs and then report CQI to the eNB. Instead of the CQI, the UEs may report the RSRP), the eNB may provide indexes indicating different block lengths based on the CQI to the UEs for UL SRS allocation.

In FIG. 17, when the eNB receives report indicating CQIs as UE 1: CQI=12, UE 2: CQI=4, UE 3: CQI=15, UE 4: CQI=2, and UE 5: CQI=7, from the UEs, the eNB may generally determine the (SRS) block lengths as 50 RBs for UE 2 and UE 4, 25 RBs for UE 5, and 10 RBs for UE 1 and UE 3 and inform a corresponding UE of the determined block length.

Figure 18:
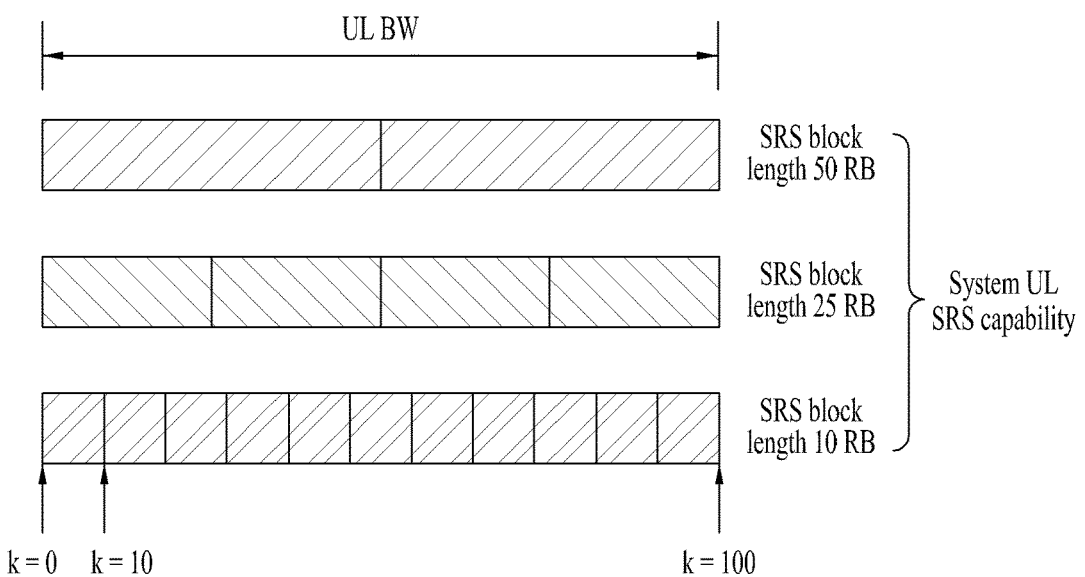
FIG. 18 is a diagram illustrating an (SRS) block length configuration according to an SRS resource location.

FIG. 18 is a diagram illustrating an (SRS) block length configuration according to an SRS resource location.

In the example of FIG. 17, the eNB may transmit information about an SRS resource position to the UE so that a UE may derive an (SRS) block length. The resource allocation position is fixedly configured according to a block length. In other words, a starting position $k_0$ allocated to a UE having a block length of 50 RBs may be RB 0 and RB 50 and a starting position $k_0$ allocated to a UE having a block length of 10 RBs may be $k_0=\{RB\ 0, 10, 20, 30, \ldots, 90\}$. Therefore, the eNB may configure the SRS resource allocation starting position of UE 1 as $k_0=RB\ 20$ and an SRS BW as 70 RBs and inform UE 1 of the configured starting position and the SRS BW. If the eNB configures the SRS resource allocation starting position of UE 2 as $k_0=RB\ 50$ and the SRS BW as 50 RBs and informs UE 2 of the configured starting position and the SRS BW and if a block configuration position is basically as illustrated in FIG. 18, then UE 1 may recognize that the (SRS) block length is 10 RBs and UE 2 may recognize that the (SRS) block length is 50 RBs.

When an overlapping position is $k_0$=RB 50 in the example of FIG. 18, if the eNB transmits information about an SRS resource ending position to the UE (e.g., $k_1$=RB 70 is transmitted to UE 1 and $k_1$=RB 100 is transmitted to UE 2), UE 1 may recognize that the block length thereof is 10 RBs and generate an SRS on a corresponding resource, and UE 2 may recognize that the block length thereof is 50 RBs and generate the SRS on a corresponding resource. If the block length is ambiguous even when this method is used, the eNB may directly transmit information about the (SRS) block length.

As an embodiment, Table 11 shows an example in which SRS sequence generation parameters are linked with block lengths.

TABLE 11

| Root id | CS | Resource position | (SRS) block length |
|---------|----|--------------------|--------------------|
| 2 | 3 | $k_0$ = 50RB | 50RB |
| 4 | 5 | $k_0$ = 10RB | 10RB |
| 6 | 12 | $k_0$ = 50RB | 25RB |
| 9 | 2 | $k_0$ = 50RB | 10RB |

If the UE receives report on information about SRS sequence generation parameters and information about a location as shown in Table 11, the UE may derive an SRS block length corresponding to the reported information. The eNB may transmit the information of Table 11 to the UE through RRC signaling, a media access control (MAC) control element (CE), or downlink control information (DCI). The UE may derive the block length according to the number of SRS sequence generation parameters and an SRS BW.

If the eNB transmits the number of parameter sets, n=2, to the UE (e.g., {TC1, TC offset 1, CS 1, root 1} and {TC 2, TC offset 2, CS 2, root 2}) and, in this case, if an SRS BW is 50 RBs, then the UE may understand a block length thereof as 25 RBs.

Proposal 1-1

As a detailed proposal of Proposal 1, information transmitted by the eNB may be transmitted through L3 (RRC), or L1 (MAC-CE or DCI) in order to cause the UE to derive an (SRS) block length thereof in Proposal 1. A transmission configuration combination of parameters is as follows.

A value indicating one (SRS) block length may be transmitted through RRC, information about a frequency allocation starting and/or ending position of a resource of a block unit may be transmitted through DCI, and information about the number of sequence generation parameter sets for an allocated resource may be transmitted through a MAC-CE.

The value indicating one (SRS) block length may be transmitted through RRC, the information about a frequency allocation starting and/or ending position of a resource of a block unit may be transmitted through the DCI, and the information about the number of sequence generation parameter sets for an allocated resource may also be transmitted through the DCI.

The value indicating one (SRS) block length may be transmitted through the DCI, the information about a frequency allocation starting and/or ending position of a resource of a block unit may be transmitted through the DCI, and the information about the number of sequence generation parameter sets for an allocated resource may be transmitted through RRC.

The value indicating one (SRS) block length may be transmitted through the DCI, the information about a frequency allocation starting and/or ending position of a resource of a block unit may be transmitted through the DCI, and the information about the number of sequence generation parameter sets for an allocated resource may be transmitted through RRC.

The value indicating one (SRS) block length may be transmitted through the DCI, the information about a frequency allocation starting and/or ending position of a resource of a block unit may be transmitted through the MAC-CE, and the information about the number of sequence generation parameter sets for an allocated resource may be transmitted through RRC. In addition to the four combinations, more various combinations may be configured.

Proposal 2

For a hybrid configuration of an SRS of concatenated blocks and an SRS of truncated blocks, the following SRS rules may be configured.

(1) A block length and the number of blocks may be configured over a total UL system BW. For example, when a UL system BW is 100 RBs and a block length is configured as 20 RBs, the eNB may inform the UE that the number of blocks is 5.

(2) Each UE configures an allocated SRS BW in a block unit. If it is difficult to indicate the SRS BW as blocks of an integer number (for example, when the block length is 10 RBs and the SRS BW is 25 RBs), the UE may perform truncation in a corresponding block. For example, when the block length is 10 RBs and the SRS BW is 25 RBs, the SRS BW consists of 3 blocks and the UE performs truncation with respect to the third block. Therefore, the UE generates a sequence of the third block according to an independently configured sequence generation parameter, truncates 5 RBs from the block length of 10 RBs according to a truncation configuration, and allocates a related resource.

The SRS BW may be indicated as n sub-bands. Herein, n is an integer. A sub-band is a unit smaller than a block. For example, when the block length is 10 RBs, the sub-band may be configured as 2 RBs. Therefore, when the SRS BW is configured as 24 RBs, the SRS BW may be configured by two blocks and two sub-bands or as 12 sub-bands when the SRS BW is represented as the number of sub-bands. One block may be configured as the number of sub-bands of an integer multiple. Therefore, a block position in which truncation occurs may be determined according to an SRS BW and an SRS allocation position and truncation may be performed in a corresponding block.

Figure 19:
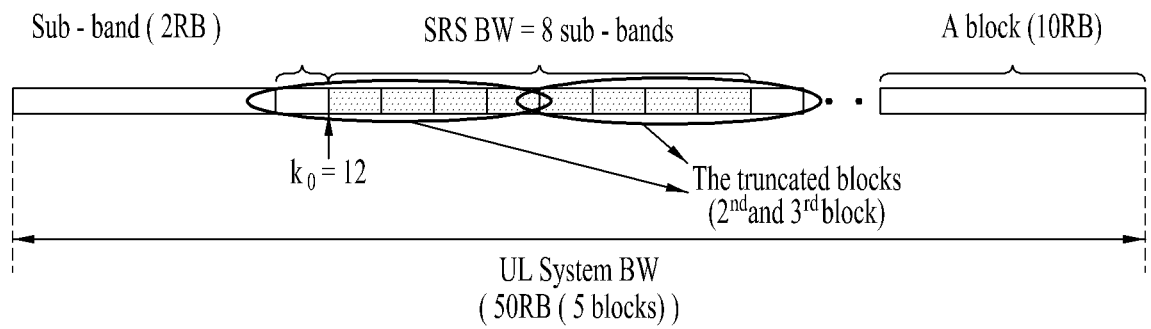
FIG. 19 is a diagram illustrating an SRS BW configuration and a truncation configuration according to a configuration of the number of blocks and the number of sub-bands.

FIG. 19 is a diagram illustrating an SRS BW configuration and a truncation configuration according to a configuration of the number of blocks and the number of sub-bands.

As an embodiment, as illustrated in FIG. 19, when a UL system BW is 50 RBs, a block length is 10 RBs, and a sub-band length is 2 RBs, then an SRS BW may be allocated as 16 RBs and an allocation starting position may be configured as $k_0$=12 (RB 12). When SRS sequence generation parameters in blocks over a UL system BW are configured {TC1, CS 1, root 1} for the first block, {TC 2, CS 2, root 2}) for the second block, . . . , and {TC5, CS 5, root 5} for the fifth block, since the SRS BW consists of 8 sub-bands and k0=12 as illustrated in FIG. 19, the UE truncates the first sub-band in the second block and the fifth sub-band in the third block and then transmits an SRS on corresponding resources (in a region as indicated as dashed lines in FIG. 19). Accordingly, the UE concatenates the truncated second and third blocks and then transmits the SRS in the concatenated blocks (in a region as indicated by dashed lines in FIG. 19).

Proposal 2-1

As a detailed proposal of Proposal 2, when truncation is performed in each (SRS) block for improvement in SRS resource allocation flexibility, the eNB provides information related to such truncation to the UE. Information about a resource position to which truncation is applied may be one or multiple combinations of the following information.

(1) Truncated block index
(2) SRS frequency resource starting position $k_0$ and/or ending position $k_1$
(3) Information about a truncated frequency region range (e.g., truncation starting position $k_0'$ and truncation ending position $k_1'$)
(4) Information about sequence generation parameters of a truncated block (e.g., TC, TC offset, CS, root, etc.)
(5) Information about the number of sequence generation parameter sets of a truncated block (e.g., number of sets {TC, TC offset, CS, root}, n)
(6) Truncation operation enabler: Information about a flag indicating permission of a truncation operation for each block
(7) Information of various combinations of (1) to (6)

The truncation operation enabler is a flag for indicating which blocks are blocks for which truncation is permitted among allocated blocks. As an embodiment, if the eNB transmits the truncation operation enabler indicating '101' to the UE with an SRS BW consisting of 3 blocks, the UE may be aware that truncation is permitted only for the first and third blocks indicated as '1'.

Hereinbelow, an example of a configuration of blocks to which truncation is applied will be described as an embodiment.

Figure 20:
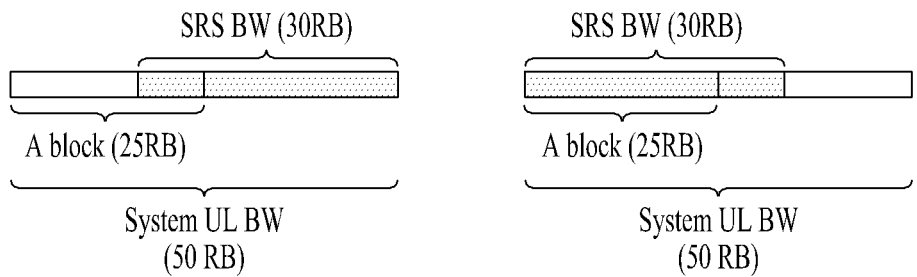
FIG. 20 is a diagram illustrating contiguous SRS resources (continuous SRS BW=30 RBs) caused by truncation in one block.

FIG. 20 is a diagram illustrating contiguous SRS resources (continuous SRS BW=30 RBs) caused by truncation in one block.

Referring to FIG. 20, it is assumed that a system BW is 50 RBs and a block length of a specific UE is configured as 25 RBs. In this case, if an SRS BW of 30 RBs is allocated, an SRS resource of 30 continuous RBs may be allocated to the specific UE through the following configuration.

As in FIG. 20, if the eNB allocates an SRS resource with an SRS BW up to RB 50 starting from RB 20 ($k_0$=20) to a specific UE, the eNB may transmit sequence generation parameters for two blocks (e.g., {TC1, TC offset 1, CS 1, root 1} for the first block and {TC 2, TC offset 2, CS 2, root 2} for the second block) to the UE and transmit information about a truncated block index indicating a truncated block to the UE.

After receiving information about the sequence generation parameters for each block and information indicating a truncated block, if the truncation block index is 0, the UE may generate a sequence for the first block and perform truncation in the first block. In this case, a truncation region is from RB 0 to RB 25. If the truncation block index of 1 is indicated, the UE performs truncation from RB 30 to RB 50 in the second block. Even if truncation is performed in the first block or the second block, contiguous SRS resources of 30 RBs are formed when the two blocks are concatenated. The UE transmits an SRS to the eNB in a region of 30 contiguous RBs formed by concatenating the two blocks.

Figure 21:
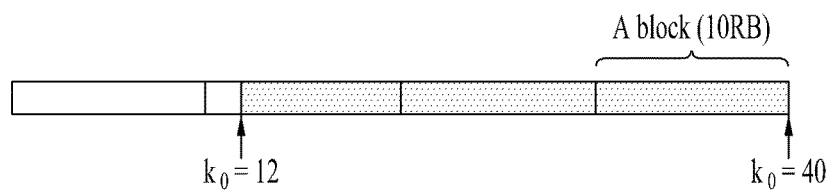
FIG. 21 is a diagram illustrating SRS block truncation through transmission of SRS resource position information.

FIG. 21 is a diagram illustrating SRS block truncation through transmission of SRS resource position information.

A configuration of blocks to which truncation is applied (example of transmission of truncated resource position information) will now be described. As a method of directly transmitting information about an SRS frequency resource starting position $k_0$ and/or ending position $k_1$ to the UE, the eNB may inform the UE of the position of a truncated resource. As an example, if the eNB transmits information about a block length of 10 RBs, an SRS resource starting position of RB 12 ($k_0$=12), and an SRS resource ending position of RB 40 ($k_1$=40) to the UE, the UE may recognize that the second block is truncated. Therefore, the UE truncates a region from RB 11 to RB 12 of the second blocks in a UL system BW.

Proposal 2-2

The eNB may transmit information for configuring blocks to which truncation is applied (example of transmission of truncated resource position information) to the UE through L3 (RRC) or L1 (MAC-CE or DCI). A transmission configuration combination of parameters is as follows.

A truncated block index may be signaled through RRC, information about a frequency allocation starting position and/or ending position of an SRS resource may be signaled through DCI, and information about the number of sequence generation parameter sets for a truncated block resource may be signaled through a MAC-CE.

The truncated block index may be signaled through RRC, the information about a frequency allocation starting position and/or ending position of an SRS resource may be signaled through the DCI, and the information about the number of sequence generation parameter sets for a truncated block resource may be signaled through the DCI.

The truncated block index may be signaled through the DCI, the information about a frequency allocation starting position and/or ending position of an SRS resource may be signaled through the DCI, and the information about the number of sequence generation parameter sets for a truncated block resource may be signaled through RRC.

The truncated block index may be signaled through the DCI, the information about a frequency allocation starting position and/or ending position of an SRS resource may be signaled through the MAC-CE, and the information about the number of sequence generation parameter sets for a truncated block resource may be signaled through RRC. A combination of the information for RRC, MAC-CE, and DCI may be more variously configured.

To satisfy a low correlation of sequences between overlapped UEs in a truncated block, the eNB may equally configure a part (e.g., TC and root value) of sequence generation parameters of an allocated block and provide the parameters to the UE. The eNB may differently configure a CS value applied to a corresponding block so that sequences between UEs may satisfy a low correlation. Therefore, a sequence generation configuration for the truncated block may be considered as follows.

Proposal 2-3

A combination of sequence generation parameters in a truncated block may be configured as follows.

The eNB may semi-statically transmit a TC, a TC offset, and a root value of a truncated block through cell-specific and/or UE-specific RRC signaling and UE-specifically transmit a CS value through DCI.

The eNB may semi-statically transmit only the root value of the truncated block through cell-specific and/or UE-specific RRC signaling and UE-specifically transmit the TC, the TC offset, and the CS value through the DCI.

The eNB may use a part (e.g., the TC/TC offset and/or the root value) of sequence generation parameters which have been allocated to a corresponding block in an instance in which the latest SRS has been transmitted when a truncated block is triggered and dynamically transmit the other parts (e.g., the CS value) through the DCI.

The eNB may provide sequence parameters of each block to the UE so that performance such as PAPR and CM may not be greatly degraded while SRS resource flexibility is improved as compared with an SRS of concatenated blocks.

Proposal 3

For a hybrid configuration of an SRS concatenated blocks and an SRS of truncated blocks, the following SRS rules may be configured.

(1) The eNB may determine a block length or the number of blocks, which are configured according to an SRS BW configuration and an SRS configuration capability of the UE (e.g., maximum allowable PAPR/CM of the UE or power back-off according to PA performance of a transmitter of the UE), and configure or determine the position of a truncated block and a truncated length within the block.

For example, if an SRS BW is configured as 50 RBs and the maximum allowable PAPR is reported as 6 RBs as the SRS configuration capability of the UE, the eNB determines the number of blocks, a block length, and a truncation degree, that satisfy these requirements. As an example, if the number of blocks within a PAPR of 6 dB is 3, each block length may be configured as 20 RBs and an index of a truncated block may be set to 3 so that the eNB informs the UE of this information. Therefore, 10 RBs are truncated in the third block and two 20-RB blocks and one truncated 10-RB block are concatenated so that an SRS BW of a total of 50 RBs may be configured.

(2) The UE may report feedback for recommending an SRS BW thereof and an SRS resource allocation position to the eNB. The eNB may inform the UE of the number of (SRS) blocks, one (SRS) block length, and a truncated (SRS) block configuration (e.g., information about truncation such as a truncation degree) in consideration of the SRS configuration capability and feedback.

For example, when a specific UE transmits feedback indicating that a desired SRS BW is 45 RBs and a desired position of the SRS BW is between RB 20 to RB 65 to the eNB, if a PAPR requirement is within 6 dB, the eNB may determine that the SRS BW of the specific UE consists of two blocks and each block length is 25 RBs. In this case, the eNB commands the UE to truncate the second block from 25 RBs to 20 RBs and may provide sequence generation parameters for each block. Therefore, a PAPR according to a total SRS BW is configured not to exceed 6 dB.

(3) UEs having different block lengths may maintain orthogonality for SRS transmission by applying an FDM scheme (e.g., different TCs or different TC offsets).

Proposal 4

One of a starting position or ending position of an SRS BW may be configured to be aligned with a unit position of a configurable minimum sounding length K1. K1 may be multiple RBs or REs.

Figure 22:
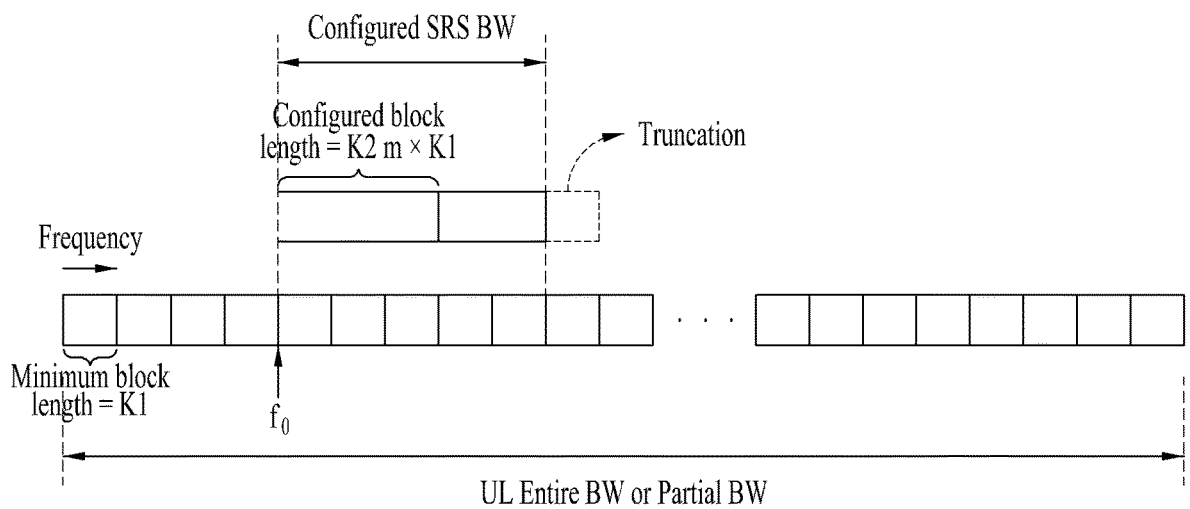
FIG. 22 is a diagram illustrating an example of a frequency resource configuration and SRS arrangement (a starting position of an SRS BW is aligned with position of a minimum sounding length).

FIG. 22 is a diagram illustrating an example of a frequency resource configuration and SRS arrangement (a starting position of an SRS BW is aligned with position of a minimum sounding length).

Referring to FIG. 22, one of a starting position and an ending position of an SRS BW may be configured to be aligned with a unit position of a configurable minimum sounding length K1. That is, the resource starting or ending position for SRS BW arrangement over a full band may be cell-specifically fixed to be aligned with a unit of the configurable minimum sounding length K1 (i.e., k×K, k=0, . . . , $N_{k1}$). Alternatively such a common grid may be previously specified by a network.

One base sequence allocated to the minimum sounding length may be mapped to one SRS resource. An SRS may be transmitted on one SRS resource in a manner corresponding to one beam.

Alternatively, when one SRS resource spans a plurality of symbols, the same transmission (Tx) beam may be transmitted on the SRS resource. A base sequence allocated to one block of the minimum sounding length may be equally allocated to a block corresponding to the SRS resource in each symbol. Alternatively, the SRS resource may be allocated to one block of a configured sounding length and a base sequence allocated to a block corresponding to the SRS resource in each symbol may be equally allocated to each symbol.

Alternatively, when one SRS resource spans a plurality of symbols, the SRS resource may be configured by a plurality of blocks having a configured length. In this case, a base sequence allocated to the plural blocks corresponding to the SRS resource in each symbol may be equally allocated to each symbol.

When concatenated SRS blocks are configured for cell-centered UEs for flexible resource utilization, a hybrid scheme of a method of configuring an SRS in an SRS BW by limiting the number of blocks according to the SRS BW in order to basically lower a high PAPR and instead increasing a sequence length mapped to one block and a method of truncating an SRS resource length within one block in order to further improve SRS allocation flexibility may be used.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting an SRS and a UE therefor are industrially applicable to various wireless communication systems such as a 3GPP LTE/LTE-A system, a 5G communication system, etc.

The invention claimed is:

1. A method for Sounding Reference Symbol (SRS) transmission by a user equipment in a wireless communication system, the method comprising:
receiving, from a base station, SRS configuration information for SRS transmission in concatenated SRS blocks; and
transmitting an SRS on the concatenated SRS blocks to the base station based on information determined from the SRS configuration information,
wherein the information determined from the SRS configuration information includes: a length of one SRS block that is same for all the concatenated SRS blocks, an SRS bandwidth, a number of the SRS blocks in the SRS bandwidth, an SRS starting position in a frequency domain, and SRS sequence generation parameters.

2. The method of claim 1, wherein the SRS configuration information is received through Radio Resource Control (RRC) signaling.

3. The method of claim 1, wherein the SRS configuration information further includes information indicating a SRS block in which truncation is performed among the concatenated SRS blocks and information about a frequency region range in which the truncation is performed.

4. The method of claim 3, wherein the SRS block in which the truncation is performed is different in length in a frequency region from remaining SRS blocks.

5. The method of claim 3, wherein the information about the frequency region range in which the truncation is performed includes at least one of a truncation starting position or a truncation ending position.

6. The method of claim 1, wherein the SRS sequence generation parameters includes at least one of a root index, a cyclic shift (CS) index, a transmission comb (TC), or a TC offset, for sequence generation.

7. A method for Sounding Reference Symbol (SRS) transmission by a user equipment in a wireless communication system, the method comprising:
transmitting, to a base station, information about an SRS configuration capability of the user equipment;
receiving, from the base station, SRS configuration information for SRS transmission in a unit of concatenated SRS blocks; and
transmitting an SRS on the concatenated SRS blocks to the base station based on information determined from the SRS configuration information,
wherein the information determined from the SRS configuration information includes a length of one SRS block that is same for all the concatenated SRS blocks, and a number of SRS blocks, and
wherein the SRS configuration information is determined based on the information about the SRS configuration capability of the user equipment.

8. The method of claim 7, wherein the information about the SRS configuration capability of the user equipment includes at least one of information about a required Peak-to-Average Power Ratio (PAPR), information about a desired SRS bandwidth, or information about a desired SRS allocation position.

9. A user equipment configured for Sounding Reference Symbol (SRS) transmission in a wireless communication system, the user equipment comprising:
a transmitter;
a receiver; and
a processor,
wherein the processor is configured to:
control the receiver to receive, from a base station, SRS configuration information for SRS transmission in concatenated SRS blocks; and
control the transmitter to transmit an SRS on the concatenated SRS blocks to the base station based on information determined from the SRS configuration information,
wherein the information determined from the SRS configuration information includes a length of one SRS block that is same for all the concatenated SRS blocks, an SRS bandwidth, a number of the SRS blocks in the SRS bandwidth, an SRS starting position in a frequency domain, and SRS sequence generation parameters.

10. The user equipment of claim 9, wherein the SRS configuration information further includes information indicating an SRS block in which truncation is performed among the concatenated SRS blocks and information about a frequency region range in which the truncation is performed.

11. A user equipment configured for Sounding Reference Symbol (SRS) transmission in a wireless communication system, the user equipment comprising:
a transmitter;
a receiver; and
a processor, wherein the processor is configured to:
control the transmitter to transmit, to a base station, information about an SRS configuration capability of the user equipment;
control the receiver to receive, from the base station, SRS configuration information for SRS transmission in concatenated SRS blocks; and
control the transmitter to transmit an SRS on the concatenated SRS blocks to the base station based on information determined from the SRS configuration information,
wherein the information determined from the SRS configuration information includes a length of one SRS block that is same for all the concatenated SRS blocks, and a number of SRS blocks, and
wherein the SRS configuration information is determined based on the information about the SRS configuration capability of the user equipment.

* * * * *